US00RE38411E

(19) United States
(12) Reissued Patent
Yamaguchi et al.

(10) Patent Number: US RE38,411 E
(45) **Date of Reissued Patent: *Feb. 3, 2004**

(54) WASHING METHOD AND CLOTHES DETERGENT COMPOSITION

(75) Inventors: Shu Yamaguchi, Wakayama (JP); Noriaki Ushio, Wakayama (JP); Akiko Ishikura, Wakayama (JP); Katsuhiko Kasai, Wakayama (JP); Masaki Tsumadori, Wakayama (JP); Hiroyuki Yamashita, Wakayama (JP)

(73) Assignee: Kao Corporation, Tokyo (JP)

( * ) Notice: This patent is subject to a terminal disclaimer.

(21) Appl. No.: 09/970,688

(22) PCT Filed: Sep. 1, 1995

(86) PCT No.: PCT/JP95/01750

§ 371 (c)(1),
(2), (4) Date: Mar. 11, 1997

(87) PCT Pub. No.: WO96/08552

PCT Pub. Date: Mar. 21, 1996

Related U.S. Patent Documents

Reissue of:
(64) Patent No.: 5,961,662
Issued: Oct. 5, 1999
Appl. No.: 08/793,870
Filed: Mar. 11, 1997

(30) Foreign Application Priority Data

Sep. 13, 1994 (JP) ..... 6-247279

(51) Int. Cl.[7] ..... C11D 3/08; C11D 3/12

(52) U.S. Cl. ..... 8/137; 510/356; 510/361; 510/376; 510/348; 510/532; 510/533; 510/276

(58) Field of Search ..... 8/137; 510/356, 510/361, 276, 376, 348, 532, 533

(56) References Cited

U.S. PATENT DOCUMENTS 4,231,887 A * 11/1980 Denny et al. ..... 510/532
4,255,148 A * 3/1981 Reinwald et al. ..... 8/137

(List continued on next page.)

FOREIGN PATENT DOCUMENTS

| | | | |
|---|---|---|---|
| EP | 550048 | * | 7/1993 |
| EP | 0 551 670 A1 | | 7/1993 |
| JP | 6-10000 | | 1/1994 |
| JP | 6-501737 | | 2/1994 |
| JP | 6-116592 | | 4/1994 |
| JP | 6-172794 | | 6/1994 |
| JP | 7-53992 | | 2/1995 |

OTHER PUBLICATIONS

Derwent Abstract for Japanese Patent No. JPA60227895, Nov. 13, 1985.*

(List continued on next page.)

*Primary Examiner*—Alan Diamond
(74) *Attorney, Agent, or Firm*—Birch, Stewart Kolasch & Birch, LLP

(57) ABSTRACT

A washing method is described which has excellent washing power and a low surfactant concentration. The described clothes washing method comprises the use of a phosphorus-free clothes detergent composition comprising (a) one or more surfactants, (b) one or more alkali metal silicates, and (c) one or more metal ion capturing agents other than the alkali metal silicate (b). The above detergent composition is added to water in an amount sufficient to produce a washing liquid having the following washing conditions (1) a pH of not less than 10.60; (2) containing a material having an ion capturing capacity in an amount sufficient for theoretically changing the water hardness of said water to be not more than 0.5° DH; and (3) having a surfactant concentration of from 0.07 to 0.17 g/L.

17 Claims, 1 Drawing Sheet

U.S. PATENT DOCUMENTS

| | | | | | |
|---|---|---|---|---|---|
| 4,303,556 | A | * | 12/1981 | Llendado | 510/452 |
| 4,419,260 | A | * | 12/1983 | Reuter et al. | 510/347 |
| 5,431,846 | A | * | 7/1995 | Christopher et al. | 510/533 |
| 5,658,872 | A | * | 8/1997 | Du Vosel et al. | 510/532 |
| 5,961,662 | A | * | 10/1999 | Yamaguchi et al. | 8/137 |
| 5,980,580 | A | * | 11/1999 | Yamaguchi et al. | 8/137 |
| 6,114,297 | A | * | 9/2000 | Yamaguchi et al. | 510/351 |
| 6,159,919 | A | * | 12/2000 | Yamaguchi et al. | 510/312 |
| 6,174,852 | B1 | * | 1/2001 | Hayashi et al. | 510/480 |
| 6,211,141 | B1 | * | 4/2001 | Yamaguchi et al. | 510/531 |
| 6,214,787 | B1 | * | 4/2001 | Yamaguchi | 510/511 |
| 6,284,722 | B1 | * | 9/2001 | Yamaguchi et al. | 510/357 |
| 6,335,313 | B1 | * | 1/2002 | Kasai et al. | 510/349 |

OTHER PUBLICATIONS

Derwent Abstract for Japanese Patent No. JPA2178398, Dec. 29, 1988.*

Derwent Abstract for Japanese Patent No. JPA2178399, Dec. 29, 1988.*

Derwent Abstract for Japanese Patent No.JPA6500141, Aug. 5, 1991.*

Derwent Abstract for Japanese Patent No. JPA6502199, Oct. 7, 1991.*

Derwent Abstract for Japanese Patent No. JPA6116588, Oct. 8, 1992.*

* cited by examiner

WASHING METHOD AND CLOTHES DETERGENT COMPOSITION

Matter enclosed in heavy brackets [ ] appears in the original patent but forms no part of this reissue specification; matter printed in italics indicates the additions made by reissue.

This application is a 371 of PCT/JP95/01750 filed Sep. 01, 1995.

TECHNICAL FIELD

The present invention relates to a washing method and a phosphorus-free clothes detergent composition. More specifically, the present invention relates to a washing method capable of having excellent washing power with a low surfactant concentration in the washing liquid and a small dosage, and a clothes detergent composition capable of achieving given washing conditions with a small amount of dosage thereof.

BACKGROUND ART

Various kinds of chelating agents, ion exchange materials, alkalizers, and dispersants have been known to be used for builders to be blended in detergents. Since the phosphate-based chelating agents having tripolyphosphates as a main component thereof have good water solubility and washing power, they are preferred.

In recent years, the use of tripolyphosphates has decreased, since they can cause eutrophication in closed freshwater areas such as lakes and marshes. Instead, crystalline aluminosilicates (zeolites), typically those disclosed in Japanese Patent Laid-Open No. 50-12381, have been commonly used. In a detergent blend using the above zeolite, the standard amount of dosage for the detergent in Japan is generally about 40 g/30 L. Also, the powdery detergents available at that time had low bulk density of from 0.20 to 0.45 g/ml from the viewpoint of solubility in cold water. As a result, the standard volumetric amount of dosage was about from 90 to 200 ml/30 L, which were extremely inconvenient for handling in distribution, at stores and homes.

Therefore, an intense investigation has been made to produce compact detergents. For instance, Japanese Patent Laid-Open Nos. 62-167396, 62-167399, and 62-253699 disclose remarkable decrease in the amount of crystalline inorganic salts such as sodium sulfate used as powdery aids conventionally contained in detergents. In addition, Japanese Patent Laid-Open Nos. 61-69897, 61-69899, 61-69900, and 5-209200 disclose that by increasing the bulk density of the detergents, to thereby have a bulk density of from 0.60 to 1.00 g/ml, only a standard amount of dosage of 25 to 30 g/30 L is required, thereby making the detergents compact to have standard volumetric amount of dosage of from 25 to 50 ml/30 L.

However, in conventional detergents, a large amount of surfactants had to be blended in the detergent compositions because the mainstream idea was to make the oily components in dirt soluble by surfactants. Specifically, sebum dirt originated by human bodies, which is the most typical dirt adhered to clothes, most likely to be observed on collars and sleeves, is an example. The sebum dirt contains oily components, such as free fatty acids and glycerides, with a high content of not less than 70% (Ichiro KASHIWA et al., "Yukagaku," 19, 1095 (1969)). The oily components lock carbon and dirt in dust and peeled keratin, so that the resulting substance is observed as dirt. In order to wash off the sebum dirt, conventionally, detergents are designed based on a washing mechanism mainly by making these oily components soluble with micelle of surfactants, thereby detaching carbon, dirt, and keratin from clothes. This technical idea has been widely established among those of ordinary skill in the art, and even when the conventional detergents are shifted to compact detergents, substantially no changes took place in the surfactant concentration in the washing liquid. This fact is described in "Dictionary for Detergents and Washing," Haruhiko OKUYAMA et al., p. 428, 1990, First Edition, Asakura Publishing Company Limited, which shows that there are substantially no changes in concentrations in the washing liquid for components other than sodium sulfate.

Based on these washing principles, the surfactant concentration in the washing liquid has to be made high in order to achieve high washing power, so that a large amount of surfactants has to be blended in the detergent composition. Therefore, a drastic reduction in the standard amount of dosage of the detergents was actually difficult. In addition, the presently known production method substantially enables to increase the bulk density to a level of about at most 1.00 g/ml. Therefore, a further reduction in the standard volumetric amount was deemed to be technically extremely difficult problem.

On the other hand, crystalline silicates having particular structure disclosed in Japanese Patent Laid-Open Nos. 5-184946 and 60-74595 shows not only good ion exchange capacity and actions of alkalizers (alkaline capacity). Therefore, possibility of more compact detergents has been investigated because both of the functions of two different components, including metal ion capturing agents, such as zeolites, and alkalizers, such as sodium carbonate, can be satisfied with the above crystalline silicates alone.

For instance, Japanese Patent Laid-Open No. 6-116588 is concerned with a detergent composition containing a crystalline silicate. In Examples of this publication disclosing a more compact detergent, even in a case where the amount of the detergent composition at washing is reduced by 25%, the detergent composition has a washing power substantially the same as conventional detergent compositions. However, since the composition was formulated based on the conventional washing principle, the surfactant concentration was high, and the alkaline capacity and the ion exchange capacity were ascribed solely to the crystalline silicates contained therein. In this case, the functions of the crystalline silicates as alkalizers precede their functions as metal ion capturing agents, so that the washing power of the detergent composition was not always satisfactory. Therefore, if the amount of dosage of the detergent composition were reduced, a good washing power could not maintained.

A number of patent applications have been filed concerning the crystalline silicates disclosed in Japanese Patent Laid-Open NO. 60-74595. Japanese Patent Unexamined Publication No. 6-502199 discloses a detergent comprising a layered crystalline silicate, a zeolite, and a polycarboxylate in particular proportions, to thereby provide a detergent free from providing film layer formation on fibers and having excellent washing power and bleaching agent stability. However, under the blending conditions given in this publication, when the amount of the detergents added was reduced at washing, the alkaline capacity is not sufficient because the amount of silicate in the builder composition is small, thereby making it impossible to maintain good washing power. Also, this publication never teaches the technical idea that an excellent washing power is exhibited in a small amount of dosage of detergents.

The technical idea that an excellent washing power is exhibited in a small amount of dosage of detergents as in the present invention cannot be found for detergents containing crystalline silicates disclosed in Japanese Patent Unexamined Publication 6-500141, Japanese Patent Laid-Open Nos 2-178398 and 2-178399. Rather, in the case where the amounts of the detergent compositions shown in each of Examples are reduced, the washing power is lowered.

Further, U.S. Pat. No. 4,303,556 and EP-A-0550048 disclose detergent compositions comprising surfactants, aluminosilicates, and alkali metal silicates. However, these publications do not disclose that the detergent compositions show high washing power even when the surfactant concentration is low.

DISCLOSURE OF THE INVENTION

An object of the present invention is to provide a washing method with excellent washing power while having a low surfactant concentration by restudying a concept of the washing mentioned above.

Another object of the present invention is to provide a phosphorus-free clothes detergent composition suitably giving characteristic washing conditions of the above washing method, to thereby make it possible to wash clothes with the detergent composition with a considerably smaller standard amount of dosage than conventional compact laundry detergent products requiring about 25 to 30 g/ 30 liters.

In view of the above problems, the present inventors have studied the relationship between clothes washing conditions and washing power in an extremely simplified washing system. As a result, they have developed a novel detergent composition which is sufficient for use in small amounts.

Specifically, after intensely studying the influence of the pH and the water hardness of the washing liquid to washing power, the present inventors have found the following. The higher the pH is and the lower the water hardness is, the dependency of washing power on the concentration of the surfactant becomes lower. In the case of high water hardness with high pH, the washing power drastically lowers in spite of high pH. Also, in the case where a detergent containing a surfactant is used without adding an alkalizer, the detergent has a low washing power at a low water hardness, but its washing power dependency on the water hardness becomes sufficiently lower than that of detergents containing alkalizers. From the above results, the present inventors have aimed at the relationship between the washing liquid and dirt.

As explained in the prior art section, sebum stains, which are typical stains adhered to clothes, contain fatty acids and glycerides. The stains presumably are a mixture of these organic substances, carbon, and mud-dirt or keratin. When the washing liquid has a high pH, the content of the fatty acid increases due to a hydrolysis of glycerides, and the fatty acids proceed to form into salts with an alkali metal. Alkali metal salts of fatty acids are soaps by which suspension of dirt in the washing liquid is promoted. However, the reaction of the fatty acid forming a salt is a competitive reaction with calcium ions and magnesium ions in hard water. Since the alkali metal salts of fatty acids form scum with calcium ions and magnesium ions, in the case of high water hardness, the stains are solidified without being released from the interface with the cloth. For the above reasons, high pH and low water hardness of the washing liquid results in excellent washing power, and high water hardness of the washing liquid results in low washing power. In addition, in the case where an alkalizer is not included, since sebum stains are washed by the strength of the surfactant alone, dependency on the water hardness would be considerably smaller than those containing an alkalizer.

From the above phenomena, the present inventors have found one of the reasons why the detergent composition is able to achieve substantially the same level or better washing power compared with conventional detergents while having a lower surfactant concentration than the conventional ones. A soap obtained by saponifying the fatty acid in stains due to low water hardness and high pH has excellent washing power, thereby making it possible to use a phosphorus-free clothes detergent composition with a smaller standard amount of dosage than conventional detergents depending on surfactants. The present invention has been based upon these findings.

Accordingly, the gist of the present invention is as follows:

(1) A clothes washing method using a phosphorus-free clothes detergent composition comprising a surfactant, an alkali metal silicate, and a metal ion capturing agent other than the alkali metal silicate, the weight ratio of the alkali metal silicate to the metal ion capturing agent other than the alkali metal silicate being not more than 5/1, the method comprising the step of washing clothes in a washing liquid having the following washing conditions:
  (1) The washing liquid having a pH of not less than 10.60;
  (2) The washing liquid containing a material having an ion capturing capacity in an amount sufficient for theoretically changing a water hardness of water for washing to be not more than 0.5° DH; and
  (3) The washing liquid having a surfactant concentration of from 0.07 to 0.17 g/L;

(2) The washing method described in (1) above, wherein the concentration of the detergent composition in the washing liquid is from 0.33 to 0.67 g/L for the water for washing with 2 to 6° DH;

(3) The washing method described in (1) above, wherein the concentration of the detergent composition in the washing liquid is from 0.50 to 1.20 g/L for the water for washing with 6 to 10° DH;

(4) The washing method described in (1) above, wherein the concentration of the detergent composition in the washing liquid is from 0.80 to 2.50 g/L for the water for washing with 10 to 20° DH;

(5) A phosphorus-free clothes detergent composition comprising components (a) to (c):
  (a) a surfactant;
  (b) an alkali metal silicate; and
  (c) a metal ion capturing agent other than component (b),
wherein a total amount of (a), (b), and (c) components occupies 70 to 100% by weight of the entire composition, and wherein the weight ratio of component (b) to component (a) is b/a=9/1 to 1/2, and the weight ratio of component (b) to component (c) is b/c=5/1 to 1/15;

(6) The clothes detergent composition described in (5) above, wherein the weight ratio of component (b) to component (a) is b/a=9/1 to 9/11, and the weight ratio of component (b) to component (c) is b/c=4/1 to 1/15;

(7) The clothes detergent composition described in (5) or (6) above, wherein the surfactant contains a nonionic surfactant in an amount of 50 to 100% by weight;

(8) The clothes detergent composition described in (7), wherein the nonionic surfactant is a polyoxyethylene alkyl ether having an ethylene oxide moiety with an average molar number of from 5 to 15 and an alkyl moiety with average carbon atoms of from 10 to 18;

(9) The clothes detergent composition described in any one of (5) to (8) above, wherein the alkali metal silicate is contained as an alkalizer in an amount of 50 to 100% by weight of the entire alkalizer;

(10) The clothes detergent composition described in any one of (5) to (9) above, wherein the ratio of $SiO_2/M_2O$ for the alkali metal silicate, M standing for an alkali metal, is from 0.5 to 2.6;

(11) The clothes detergent composition described in any one of (5) to (10) above, wherein the alkali metal silicate is crystalline;

(12) The clothes detergent composition described in (11) above, wherein the crystalline alkali metal silicate is represented by the following formula (I):

$$xM_2O \cdot ySiO_2 \cdot zMe_mO_n \cdot wH_2O \quad (I)$$

wherein M stands for an element in Group Ia of the Periodic Table; Me stands for one or more elements selected from the group consisting of Group IIa, IIb, IIIa, IVa, and VIII; y/x is 0.5 to 2.6; z/x is 0.01 to 1.0; n/m is 0.5 to 2.0; and w is 0 to 20;

(13) The clothes detergent composition described in (11) above, wherein the crystalline alkali metal silicate is represented by the following formula (II):

$$M_2O \cdot x'SiO_2 \cdot y'H_2), \quad (II)$$

wherein M stands for an alkali metal; x' is 1.5 to 2.6; and y' is 0 to 20;

(14) The clothes detergent composition described in any one of (5) to (13) above, wherein the (c) metal ion capturing agent contains a carboxylate polymer having a Ca ion capturing capacity of not less than 200 $CaCO_3$ mg/g in an amount of not less than 10% by weight;

(15) The clothes detergent composition described in any one of (5) to (14) above, wherein the (c) metal ion capturing agent comprises:

(c-i) a carboxylate polymer having a Ca ion capturing capacity of not less than 200 $CaCO_3$ mg/g; and (c-ii) an aluminosilicate having an ion exchange capacity of not less than 200 $CaCO_3$ mg/g and having the following formula (III):

$$x''(M_2O) \cdot Al_2O_3 \cdot y''(SiO_2) \cdot w''(H_2O), \quad (III)$$

wherein M stands for an alkali metal; x", y", and w" each stands for a molar number of each component; x" is from 0.7 to 1.5; y" is from 0.8 to 6.0; and w" is from 0 to 20, and wherein the weight ratio of (c-i) component to (c-ii) component is (c-i)/(c-ii)=1/20 to 4/1, and the total amount of (c-i) and (c-ii) components occupies 70 to 100% by weight based on the (c) metal ion capturing agent; and

(16) The washing method described in (1) above, wherein the clothes detergent composition described in any one of (5) to (15) above is used.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

BEST MODE FOR CARRYING OUT THE INVENTION

Figure 1:
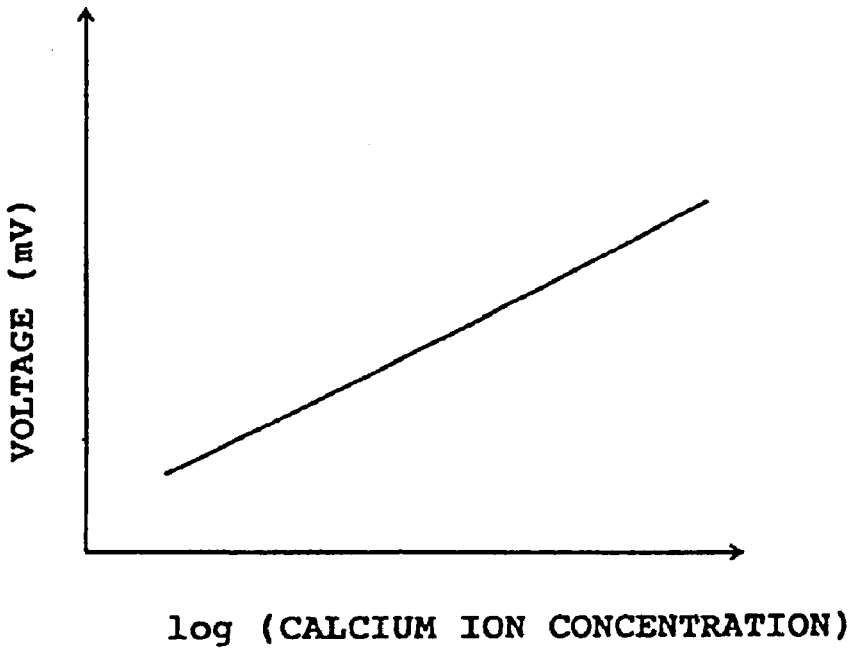
FIG. 1 is a graph showing a calibration curve of the relationship between the logarithm of the calcium ion concentration and the voltage.

The washing method of the present invention, using a phosphorus-free clothes detergent composition comprising a surfactant, an alkali metal silicate, and a metal ion capturing agent other than the alkali metal silicate, the weight ratio of the alkali metal silicate to the metal ion capturing agent other than the alkali metal silicate being not more than 5/1, is characterized by using a washing liquid having the following washing conditions:

(1) The washing liquid having a pH of not less than 10.60;

(2) The washing liquid containing a material having an ion capturing capacity in an amount sufficient for theoretically changing a water hardness of water for washing to be not more than 0.5° DH; and (3) The washing liquid having a surfactant concentration of from 0.07 to 0.17 g/L.

Here, the washing conditions are given for washing liquids including no clothes to be washed.

By setting the washing conditions as given above, the resulting washing power is excellent while having a low surfactant concentration, thereby making the standard amount of dosage of the detergents smaller than the conventional ones. When the weight ratio of the alkali metal silicate to the metal ion capturing agent other than the alkali metal silicate exceeds 5/1, sufficient washing power cannot be obtained even if the above conditions are satisfied.

In the washing method of the present invention, the preferred washing conditions for each of the washing conditions (1) to (3), are as follows.

(1') The washing liquid having a pH of from 10.85 to 11.00, more preferably from 10.90 to 11.00;

(2') The washing liquid containing a material having an ion capturing capacity in an amount sufficient for theoretically changing a water hardness of water for washing to be 0° DH, more preferably in an amount sufficient for theoretically giving so low a water hardness as −1° DH; and (3') The washing liquid having a surfactant concentration of from 0.08 to 0.14 g/L, more preferably from 0.08 to 0.11 g/L.

In addition, the weight ratio of the alkali metal silicate to the metal ion capturing agent other than the alkali metal silicate is preferably 4/1 to 1/15, more preferably 3/1 to 1/15.

Incidentally, a preference is given to those satisfying all of the preferred washing conditions, but by satisfying one or more of the above preferred washing conditions, the effects of the present invention are markedly exhibited.

In addition, although a concrete specific amount of dosage, i.e. the detergent concentration in the washing liquid, depends upon the water hardness of the water for washing used, the additional or reduced amount thereof varies depending upon the amount of the metal ion capturing agent added. Therefore, the surfactant concentration in the washing liquid does not basically change thereby for the reasons set forth below.

The standard amount of dosage of the detergents greatly differs throughout the world. This is due to the differences in the water hardness of tap water in each of the countries. For instance, while the tap water has a water hardness of usually around 4° DH in Japan, the tap water having a water hardness of not less than 6° DH in the U.S., and that exceeding 1° DH in European countries is used for the water for washing. Therefore, since the required absolute amount of the metal ion capturing agent varies, the standard amount of dosage would be adjusted accordingly. In the present invention, although the amount of the metal ion capturing agent varies depending upon the water hardness, the surfactant concentration in the washing liquid remains substantially the same, and the standard amount of dosage becomes smaller than the conventional ones.

Specifically, in cases where the initial water hardness differs in each of the washing liquids, the detergent concentrations are as follows:

1) As for the water for washing having a water hardness of 2 to 6° DH, the detergent composition has a concentration in the washing liquid of from 0.33 to 0.67 g/L, preferably from 0.33 to 0.50 g/L.
2) As for the water for washing having a water hardness of 6 to 10° DH, the detergent composition has a concentration in the washing liquid of from 0.50 to 1.20 g/L, preferably from 0.50 to 1.00 g/L.
3) As for the water for washing having a water hardness of 10 to 20° DH, the detergent composition has a concentration in the washing liquid of from 0.80 to 2.50 g/L, preferably from 1.00 to 2.00 g/L.

Here, each of the above washing conditions are measured by the following methods.

(1) The pH of the washing liquid is measured at 25° C. by such devices as a conventional glass electrode pH meter.
(2) The amount of the materials having ion capturing capacity to be present in the washing liquid, i.e., amounts of the alkali metal silicates and the metal ion capturing agents other than alkali metal silicates, is calculated as follows.

For instance, the amount corresponding to an ion capturing capacity required to theoretically change the water hardness of the water for washing to 0.5° DH is calculated by calculating a concentration of Ca and Mg ions corresponding to the hardness difference from the water hardness of the water for washing used (for instance, in Japan the water hardness is about 4° DH), and then obtaining a total calcium ion capturing capacity corresponding to the calculated ion concentration in terms of concentration units. In this case, the amount of the water for washing and the amount of the detergent composition added are so selected to satisfy the washing condition (3) above where the surfactant concentration is from 0.07 to 0.17 g/L.

Here, the methods for measuring the ion capturing capability of the metal ion capturing materials depend upon whether the ion exchange materials or the chelating agents are used for the metal ion capturing materials. The measurement methods for each of the materials are given below.

Ion Exchange Materials

A 0.1 g sample is accurately weighed and added to 100 ml of a calcium chloride aqueous solution (500 ppm concentration, when calculated as $CaCO_3$), followed by stirring at 25° C. for 60 minutes, after which the mixture is filtered using Membrane Filter (made of nitrocellulose; manufactured by Advantech) with 0.2 $\mu$m pore size. 10 ml of the filtrate is assayed for Ca content by an EDTA titration, and the calcium ion exchange capacity (cationic exchange capacity) of the sample is calculated from the titer.

Examples of the ion exchange materials used for measurement in the present invention include inorganic substances, such as crystalline alkali metal silicates and a aluminosilicates (zeolites, etc.).

Chelating Agents

The calcium ion capturing capacity was measured by the following method using a calcium ion electrode. Incidentally, the solution used herein was prepared with the following buffer solution:

Buffer: 0.1 M—$NH_4Cl$—$NH_4OH$ solution (pH 10.0)

(i) Preparation of Calibration Curve

A standard calcium ion solution was prepared and used for obtaining a calibration curve showing the relationships between the logarithm of the calcium ion concentration and the voltage, as shown in FIG. 1.

(ii) Measurement of Calcium Ion Capturing Capacity

Figure 2:
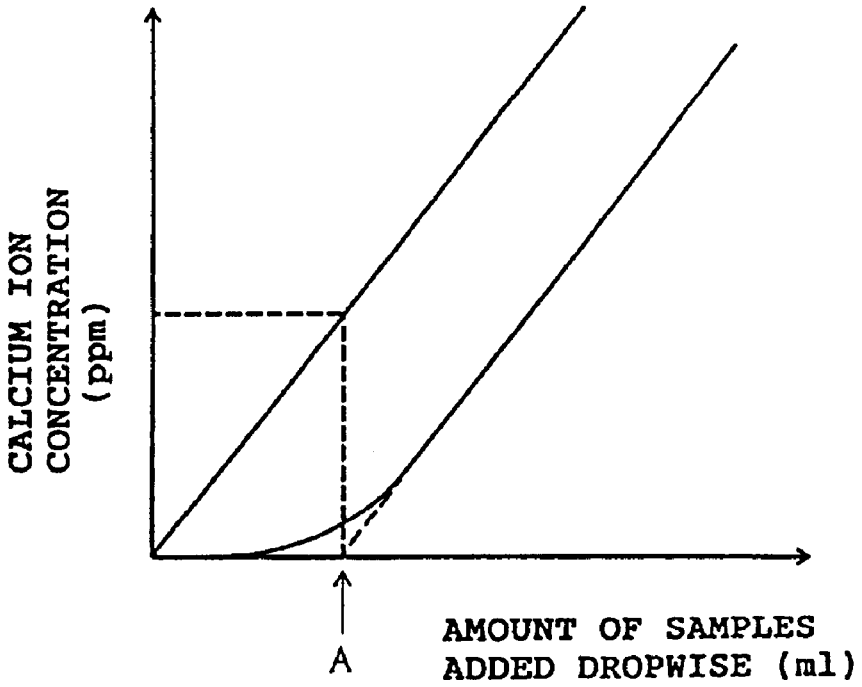
FIG. 2 is a graph showing the relationships between the amount of samples added dropwise and the calcium ion concentration.

About a 0.1 g sample was weighed into a 100 ml volumetric flask, and the volumetric flask was filled up to a volume of 100 ml with the above buffer solution. A $CaCl_2$ aqueous solution (pH 10.0) having a concentration of 20,000 ppm calculated as $CaCO_3$ was added dropwise from a burette in an amount of 0.1 to 0.2 ml for reading each sample voltage. A blank sample was also measured. Thus, a calcium ion concentration was calculated from the calibration curve given in FIG. 1 by applying a sample voltage. The calcium ion concentration of the upper line corresponding to the amount A of samples added dropwise shown in FIG. 2 was referred to as calcium ion capturing capacity. Examples of the chelating agents used for measurement in the present invention include polycarboxylates, such as citrates, and carboxylate polymers, such as acrylic acid-maleic acid copolymers.

The washing methods of the present invention are applicable to any one of the following cases.

1) The case where the water for washing has a water hardness of from 2 to 6° DH;
2) The case where the water for washing has a water hardness of from 6 to 10° DH; and
3) The case where the water for washing has a water hardness of from 10 to 20° DH.

For all of these cases, the washing conditions (1) to (3) above are similarly applicable, where only the detergent concentration is so selected for each water hardness 1) to 3) to satisfy the washing conditions (1) to (3).

As explained in the above washing method of the present invention, in order to produce a washing liquid having a high pH and a low water hardness, thereby exhibiting an excellent washing power, the washing liquid has to satisfy the following conditions.

(i) Containing excess metal ion capturing agents.
(ii) Containing an alkalizer capable of buffering at high pH.

Although crystalline silicates satisfying both (i) and (ii) above are known, much care is needed for the use of the crystalline silicate for the following reasons. The increase in the amount of the crystalline silicates for lowering water hardness results in the increase the alkaline capacity. This in turn inevitably results in an undesirable increase in the exchanging speeds of the fatty acids for Ca and Mg. Therefore, in order to satisfy more preferred conditions, the metal ion capturing agents other than the alkali metal silicates are required to be added in a given ratio. When the amount of these metal ion capturing agents other than the alkali metal silicates is outside a given range, it would be difficult to reduce the amount of the detergent used.

Accordingly, the phosphorus-free detergent composition of the present invention comprises components (a) to (c):

(a) a surfactant;
(b) an alkali metal silicate; and
(c) a metal ion capturing agent other than component (b), wherein a total amount of (a), (b), and (c) components occupies 70 to 100% by weight of the entire composition, and wherein the weight ratio of component (b) to component (a) is b/a=9/1 to 1/2, preferably 9/1 to 9/11, and the weight ratio of component (b) to component (c) is b/c=5/1 to 1/15, preferably 4/1 to 1/15.

A greater preference is given to a detergent composition containing the components (a) to (c) above, wherein a total amount of (a), (b), and (c) components occupies 80 to 100% by weight of the entire composition, and wherein the weight ratio of component (b) to component (a) is b/a=9/1 to 1/1, and the weight ratio of component (b) to component (c) is b/c=3/1 to 1/15. Most preferably, the weight ratio of component (b) to component (c) is b/c=3/1 to 3/7, in the case where the water for washing has a water hardness of from 2 to 6° DH; or b/c=4/3 to 1/6, in the case where the water for washing has a water hardness of from 6 to 10° DH; or b/c=1/1 to 1/15, in the case where the water for washing has a water hardness of from 10 to 20° DH. In the present invention, by having the above composition, a detergent composition having a remarkably smaller standard amount of dosage for each of the water for washing having different water hardness can be obtained.

Each of the components will be explained in detail below.

(a) Surfactant

The surfactants usable in the present invention are not particularly limited, and any ones generally used for detergents are used, in which a nonionic surfactant is preferably contained in an amount of from 50 to 100% by weight, more preferably from 65 to 100% by weight, of the entire surfactant. Specifically, they may be one or more surfactants selected from the group consisting of nonionic surfactants, anionic surfactants, cationic surfactants, and ampholytic surfactants, each being exemplified below. For instance, the surfactants can be chosen such that the surfactants of the same kind are chosen, as in the case where a plurality of the nonionic surfactants are chosen. Alternatively, the surfactants of the different-kinds are chosen, as in the case where the anionic surfactant and the nonionic surfactant are respectively chosen.

Examples of the nonionic surfactants are as follows:

Polyoxyethylene alkyl ethers, polyoxyethylene alkylphenyl ethers, polyoxyethylene sorbitan fatty acid esters, polyoxyethylene sorbitol fatty acid esters, polyethylene glycol fatty acid esters, alkyl polyethylene glycol fatty acid esters, polyoxyethylene polyoxypropylene alkyl ethers, polyoxyethylene castor oils, polyoxyethylene alkylamines, glycerol fatty acid esters, higher fatty acid alkanolamides, alkylglucosamides, alkylglucosides, and alkylamine oxides.

Among the nonionic surfactants, a preference is given to polyoxyethylene alkyl ethers which are ethylene oxide adducts whose alkyl moieties are ascribed to linear or branched, primary or secondary alcohols, each having 10 to 18 carbon atoms, and whose ethylene oxide moieties have an average molar number of 5 to 15, and more preferably polyoxyethylene alkyl ethers which are ethylene oxide adducts whose alkyl moieties are linear or branched, primary or secondary alcohols, each having 12 to 14 carbon atoms, and whose ethylene oxide moieties have an average molar number of 6 to 10.

Examples of the anionic surfactants include alkylbenzenesulfonates, alkyl or alkenyl ether sulfates, alkyl or alkenyl sulfates, α-olefinsulfonates, α-sulfofatty acid salts, α-sulfofatty acid ester salts, alkyl or alkenyl ether carboxylates, amino acid-type surfactants, and N-acyl amino acid-type surfactants, with a preference given to alkylbenzenesulfonates, alkyl or alkenyl ether sulfates, and alkyl or alkenyl sulfates.

Examples of the cationic surfactants include quaternary ammonium salts, such as alkyl trimethylamine salts. Examples of the ampholytic surfactants include carboxy-type and sulfobetaine-type ampholytic surfactants.

The surfactant content is preferably from 1 to 45% by weight, and the surfactant content is particularly in the following ranges, depending on the types of water for washing used.

1) In the case where the water for washing having a water hardness of 2 to 6° DH, the surfactant content is particularly preferably from 15 to 30% by weight;
2) In the case where the water for washing having a water hardness of 6 to 10° DH, the surfactant content is particularly preferably from 8 to 25% by weight; and
3) In the case where the water for washing having a water hardness of 10 to 20° DH, the surfactant content is particularly preferably from 5 to 20% by weight.

When the surfactant content is lower than the lower limit in each of the above given ranges, a sufficient washing power of the detergent cannot be obtained, and when the surfactant content exceeds the upper limit in each of the above given ranges, the amounts of the alkalizers and the metal ion capturing agent are relatively lowered, making it less likely to obtain sufficient washing power.

By having the above compositions for the clothes detergent composition of the present invention, when the detergent composition is so added to each of the water for washing to provide a surfactant concentration in the washing liquid of from 0.07 to 0.17 g/L, the concentrations of the detergent composition in each of the washing liquid are as follows depending upon the types of the water for washing used.

1) where the water for washing has a water hardness of 2 to 6° DH, the concentration of the detergent composition in the washing liquid is from 0.33 to 0.67 g/L, preferably from 0.33 to 0.50 g/L;
2) where the water for washing has a water hardness of 6 to 10° DH, the concentration of the detergent composition in the washing liquid is from 0.50 to 1.20 g/L, preferably from 0.50 to 1.00 g/L; and
3) where the water for washing has a water hardness of 10 to 20° DH, the concentration of the detergent composition in the washing liquid is from 0.80 to 2.50 g/L, preferably from 1.00 to 2.00 g/L.

Therefore, the standard amounts of dosage of the detergent composition of the present invention for obtaining a sufficient washing power are considerably smaller than the conventional compact detergent compositions.

(b) Alkali Metal Silicates

The alkali metal silicates usable in the present invention may be either crystalline or amorphous alkali metal silicates. A preference is given to crystalline alkali metal silicates for the following reasons. By forming crystalline alkali metal silicates, the silicates are provided with not only good alkaline capacity but also good ion exchange capacity, thereby making it possible to further reduce the standard amount of dosage of the detergent compositions.

Examples of the crystalline alkali metal silicates usable in the present invention include alkali metal silicates having an $SiO_2/M_2O$ ratio (wherein M stands for an alkali metal) of from 0.5 to 2.6. On the other hand, the crystalline silicates used in the reference explained in the prior art section have $SiO_2/Na_2O$ ratios of from 1.9 to 4.0. However, in the present invention, the silicates having $SiO_2/Na_2O$ ratios exceeding 2.6 would not give the effects obtained in the present invention, making it impossible to produce detergents capable of having an excellent washing power with only small standard amounts of dosage.

Among the crystalline alkali metal silicates usable in the present invention, a preference is given to those exemplified by having the following compositions (I) and (II) given below.

$$\text{i) } xM_2O \cdot ySiO_2 \cdot zMe_mO_n \cdot wH_2O, \quad \text{(I)}$$

wherein M stands for an element in Group Ia of the Periodic Table; Me stands for one or more elements selected from the group consisting of Group IIa, IIb, IIIa, IVa, and VIII; y/x is from 0.5 to 2.6; z/x is from 0.01 to 1.0; n/m is from 0.5 to 2.0; and w is from 0 to 20.

$$\text{ii) } M_2O\ x'SiO_2 \cdot y'H_2O, \quad \text{(II)}$$

wherein M stands for an alkali metal; x' is from 1.5 to 2.6; and y' is from 0 to 20.

First, the crystalline alkali metal silicates having the composition i) above will be detailed below.

In the general formula (I), M stands for an element selected from Group Ia of the Periodic Table, the Group Ia elements exemplified by Na, K, etc. The Group Ia elements may be used alone, or may constitute an $M_2O$ component by blending such compounds as $Na_2O$ and $K_{2O}$.

Me stands for one or more elements selected from the group consisting of Group IIa, IIb, IIIa, IVa, and VIII of the Periodic Table, and examples thereof include Mg, Ca, Zn, Y, Ti, Zr, and Fe. Although not being particularly limited to the above examples, a preference is given to Mg and Ca from the viewpoint of resource stock and safety. In addition, these elements may be used alone or may constitute an $Me_mO_n$, component by blending such compounds as MgO and CaO.

In addition, the crystalline alkali metal silicates usable in the present invention may be in the form of hydrates, wherein the amount of hydration (w) is normally in the range of from 0 to 20 moles of $H_2O$.

With respect to the general formula (I), y/x is from 0.5 to 2.6, preferably from 1.5 to 2.2. When y/x is less than 0.5, the obtained composition has insufficient anti-solubility in water, thereby providing drastically poor caking ability, solubility, and other powder properties of the detergent composition. When y/x exceeds 2.6, the obtained composition has a low alkaline capacity, thereby making it insufficient to be used as an alkalizer, and it also has a low ion exchange capacity, thereby making it insufficient to be used as an ion exchange material. With respect to z/x, it is from 0.01 to 1.0, preferably from 0.02 to 0.9. When z/x is less than 0.01, the obtained composition has insufficient anti-solubility in water, and when z/x exceeds 1.0, the obtained composition has a low ion exchange capacity, making it insufficient to be used as an inorganic ion exchange material. With respect to x, y and z, there are no limitations, as long as y/x and z/x have the above relationships. When $xM_2O$, for example, is $x'Na_2O \cdot x''K_2O$ as described above, x equals to x'+x". The same can be said for z when $zMe_mO_n$ comprises two or more components. Further, "n/m is from 0.5 to 2.0" indicates the number of oxygen ions coordinated to the above elements, which actually takes values selected from 0.5, 1.0, 1.5, and 2.0.

The crystalline alkali metal silicate in the present invention comprises three components, $M_20$, $SiO_2$, and $Me_mO_n$, as indicated by the general formula (I) above. Materials which can be converted to each of these components, therefore, is indispensable for starting materials for producing the crystalline alkali metal silicate in the present invention. In the present invention, known compounds can be suitably used for starting materials without limitations. Examples of the $M_2O$ component and the $Me_mO_n$ component include simple or complex oxides, hydroxides and salts of respective elements; and minerals containing respective elements. Specifically, examples of the starting materials for the $M_2O$ component include NaOH, KOH, $Na_2CO_3$, $K_2CO_3$, and $Na_2SO_4$. Examples of the starting materials for the $Me_mO_n$ component include $CaCO_3$, $MgCO_3$, $Ca(OH)_2$, $Mg(OH)_2$, MgO, $ZrO_2$, and dolomite. Examples of the starting materials for the $Si0_2$ component include silica sand, kaolin, talc, fused silica, and sodium silicate.

In the present invention, a method of producing the crystalline alkali metal silicate may be exemplified by blending these starting material components to provide the desired compositions in x, y, and z for the crystalline alkali metal silicate, and baking the resulting mixture at a temperature in the range of normally from 300 to 1500° C., preferably from 500 to 1000° C., more preferably from 600 to 900° C., to form crystals. In this case, when the heating temperature is less than 300° C., the crystallization is insufficient, thereby making the anti-solubility in water of the resulting crystalline alkali metal silicate poor, and when it exceeds 1500° C., coarse grains are likely to be formed, thereby decreasing the ion exchange capacity of the resulting crystalline alkali metal silicate. The heating time is normally 0.1 to 24 hours. Such baking can normally be carried out in a heating furnace such as an electric furnace or a gas furnace.

The crystalline alkali metal silicate in the present invention thus obtained has a pH of not less than 11 in a 0.1% by weight dispersion solution, showing an excellent alkaline capacity. Also, the crystalline alkali metal silicates particularly excels in their alkaline buffering effects, having excellent alkaline buffering effects when compared with those of sodium carbonate and potassium carbonate.

The crystalline alkali metal silicate in the present invention thus obtained has an ion exchange capacity of not less than 100 mg $CaCO_3$/g, preferably 200 to 600 mg $CaCO_3$/g, which is one of the material having an ion capturing ability in the present invention.

In the crystalline alkali metal silicate usable in the present invention, the amount of Si dissolved in water is normally not more than 110 mg/g, when calculated as $SiO_2$, which can be said to be substantially insoluble in water. Here, the term "substantially insoluble in water" means stability in water of the chemical structure concerned with the cationic exchange capacity, so that the amount of Si dissolved, when calculated as $SiO_2$, is normally not more than 110 mg/g when a 2 g sample is added to 100 g of ion exchanged water and the mixture is stirred at 25° C. for 30 minutes. In the present invention, a preference is given to a case where the amount of Si dissolved is not more than 100 mg/g for the purpose of obtaining further excellent effects of the present invention.

Since the crystalline alkali metal silicate usable in the present invention has not only good alkaline capacity and alkali buffering effects but also good ion exchange capacity, the above-mentioned washing conditions are suitably adjusted by adding suitable amounts of the crystalline alkali metal silicate.

In the present invention, the crystalline alkali metal silicate usable in the present invention has an average particle size preferably of from 0.1 to 50 $\mu$m, more preferably from 1 to 30 $\mu$m, still more preferably from 1 to 10 $\mu$m. When the average particle size of the crystalline alkali metal silicate exceeds 50 $\mu$m, the ion exchange speed thereof is likely to be slowed down, thereby resulting in the lowering of the detergency. In addition, when the average particle is less than 0.1 μm, the specific surface area increases, thereby increasing the hygroscopic property and the $CO_2$ absorption property, which in turn makes it likely to cause drastic quality deterioration. Incidentally, the average particle size referred herein is a median diameter obtained from a particle size distribution.

The crystalline alkali metal silicate having the average particle size and the particle size distribution mentioned above can be prepared by pulverizing the material using such pulverizing devices as a vibrating mill, a hammer mill, a ball-mill, and a roller mill. For instance, the crystalline alkali metal silicate can be easily obtained by pulverizing the material with a vibrating mill "HB-O" (manufactured by Chuo Kakohki Co., Ltd.).

The content of the crystalline alkali metal silicate is preferably 4 to 75% by weight in the entire composition, with a particular preference given to the following compositions depending upon the water hardness of the water for washing used.

1) In the case of using water for washing having a water hardness of from 2 to 6° DH, 25 to 55% by weight of the crystalline alkali metal silicate in the entire composition;
2) In the case of using water for washing having a water hardness of from 6 to 10° DH, 10 to 45% by weight of the crystalline alkali metal silicate in the entire composition; and
3) In the case of using water for washing having a water hardness of from 10 to 20° DH, 5 to 30% by weight of the crystalline alkali metal silicate in the entire composition.

When the content of the crystalline alkali metal silicate is outside the above given range, the washing conditions mentioned above are not likely to be satisfied.

Next, the crystalline alkali metal silicates having the composition ii) above are detailed below.

These crystalline alkali metal silicates are represented by the general formula (II):

$$M_2O \cdot x'SiO_2 \cdot y'H_2O, \quad \text{(II)}$$

wherein M stands for an alkali metal; x' is from 1.5 to 2.6; and y' is from 0 to 20.

Among them, a preference is given to the crystalline alkali metal silicates having x' and y' in the general formula (II) such that each satisfies $1.7 \leqq x' \leqq 2.2$ and $y'=0$, and those having a cationic exchange capacity of from 100 to 400 $CaCO_3$ mg/g are usable. The above crystalline alkali metal silicates are one of the materials having ion capturing capacity in the present invention.

Since the crystalline alkali metal silicate usable in the present invention has not only good alkaline effect and alkali buffering capacity but also good ion exchange capacity, the above-mentioned washing conditions are suitably adjusted by adding suitable amounts of the crystalline alkali metal silicate.

The content of the crystalline alkali metal silicate is preferably 4 to 75% by weight in the entire composition, with a particular preference given to the following compositions depending upon the water hardness of the water for washing used.

1) In the case of using water for washing having a water hardness of from 2 to 6° DH, 25 to 55% by weight of the crystalline alkali metal silicate in the entire composition;
2) In the case of using water for washing having a water hardness of from 6 to 10° DH, 10 to 45% by weight of the crystalline alkali metal silicate in the entire composition; and
3) In the case of using water for washing having a water hardness of from 10 to 20° DH, 5 to 30% by weight of the crystalline alkali metal silicate in the entire composition.

When the content of the crystalline alkali metal silicate is outside the above given range, the washing conditions mentioned above are not likely to be satisfied.

A method for producing the above crystalline alkali metal silicates is disclosed in Japanese Patent Laid-Open No. 60-227895. However, the crystalline silicates can be generally produced by baking glassy amorphous sodium silicate at a temperature of from 200 to 1000° C. Details of the production method is disclosed in "Phys. Chem. Glasses, 7, pp.127–138 (1966), Z. Kristallogr., 129, pp.396–404(1969)." Also, the crystalline alkali metal silicates are commercially available in powdery or granular forms under a trade name "Na—SKS-6" ($\delta$-$Na_2Si_2O_5$) (manufactured by Hoechst).

In the present invention, as in the case for the crystalline alkali metal silicates having the composition i), the crystalline alkali metal silicates having the composition ii) have an average particle size of preferably from 0.1 to 50 μm, more preferably from 1 to 30 μm, still more preferably from 1 to 10 μm.

In the present invention, the crystalline alkali metal silicates having the compositions i) and ii) may be used alone or in combination. It is preferred that the crystalline alkali metal silicates occupy 50 to 100% by weight of the total alkalizer contents, more preferably 70 to 100% by weight.

(c) Metal Ion Capturing Agents Other Than Alkali Metal Silicates

The metal ion capturing agents other than the alkali metal silicates in the present invention have a calcium ion capturing capacity of not less than 200 $CaCO_3$ mg/g.

A preference is given to the metal ion capturing agents containing a carboxylate polymer in an amount of not less than 10% by weight. Examples of the above carboxylate polymer include polymers or copolymers, each having repeating units represented by the general formula (IV):

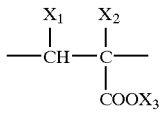

(IV)

wherein $X_1$ stands for methyl, a hydrogen atom, or $COOX_3$; $X_2$ stands for methyl, a hydrogen atom, or hydroxyl; $X_3$ stands for a hydrogen atom, an alkali metal, an alkaline earth metal, an ammonium, or ethanolamine.

In the general formula (IV), examples of the alkali metals include Na, K, and Li, and examples of the alkaline earth metals include Ca and Mg.

Examples of the polymers or copolymers usable in the present invention include those obtainable by polymerization reactions of acrylic acid, (anhydrous) maleic acid, methacrylic acid, α-hydroxyacrylic acid, crotonic acid, isocrotonic acid, and salts thereof; copolymerization reactions of each of the monomers; or copolymerization reactions of the above monomers with other polymerizable monomers. Here, examples of the copolymerizable monomers used in copolymerization reaction include aconitic acid, itaconic acid, citraconic acid, fumaric acid, vinyl phosphonic acid, sulfonated maleic acid, diisobutylene, styrene, methyl vinyl ether, ethylene, propylene, isobutylene, pentene, butadiene, isoprene, vinyl acetate (vinyl alcohols in cases where hydrolysis takes place after copolymerization), and acrylic acid ester, without particularly being limited thereto. Incidentally, the polymerization reactions are not particularly limited, and any of the conventionally known methods may be employed.

Also, polyacetal carboxylic acid polymers such as polyglyoxylic acids disclosed in Japanese Patent Laid-Open No. 54-52196 are also usable for the polymers in the present invention.

In the present invention, the above polymers and copolymers normally have a weight-average molecular weight of from 800 to 1,000,000, preferably from 5,000 to 200,000.

Also, in the case of copolymers, although the copolymerization ratio between the repeating units of the general formula (IV) and other copolymerizable monomers is not particularly limited, a preference is given to a copolymerization ratio of the repeating units of general formula (IV)/other copolymerizable monomer=1/100 to 90/10.

In the present invention, the above polymer or copolymer is contained in the composition in an amount of from 1 to 50% by weight, preferably from 2 to 30% by weight, more preferably from 5 to 15% by weight. When the amount of the polymer or copolymer is less than I* by weight, the effects of the present invention cannot be obtained, and when the amount exceeds 50% by weight, a further addition of the polymer or copolymer to the composition shows no additional effects, and merely increases the costs thereof.

In addition, a highly preferred example of the (c) metal ion capturing agent comprises:

(c-i) the carboxylate polymer mentioned above having a Ca ion capturing capacity of not less than 200 $CaCO_3$ mg/g; and (c-ii) an aluminosilicate having an ion exchange capacity of not less than 200 $CaCO_3$ mg/g and having the following formula (III):

$$x''(M_2O)\cdot Al_2O_3\cdot y''(SiO_2)\cdot w''(H_2O), \quad \text{(III)}$$

wherein M stands for an alkali metal, such as sodium or potassium; x", y", and w" each stands for a molar number of each component; and generally, x" is from 0.7 to 1.5; y" is from 0.8 to 6.0; and w" is from 0 to 20, wherein the weight ratio of (c-i) component to (c-ii) component is (c-i)/(c-ii)= 1/20 to 4/1, preferably 1/9 to 4/1. The total amount of (c-i) and (c-ii) components preferably occupies 70 to 100% by weight based on the (c) metal ion capturing agent.

The aluminosilicates mentioned above may be crystalline or amorphous, and among the crystalline aluminosilicates, a particular preference is given to those having the following general formula:

$$Na_2O\cdot Al_2O_3\cdot ySiO_2\cdot wH_2O,$$

wherein y is a number of from 1.8 to 3.0; and w is a number of from 1 to 6.

As for the crystalline aluminosilicates (zeolites), synthetic zeolites having an average, primary particle size of from 0.1 to 10 $\mu$m, which are typically exemplified by A-type zeolite, X-type zeolite, and P-type zeolite, are suitably used. The zeolites may be used in the forms of powder, a zeolite slurry, or dried particles comprising zeolite agglomerates obtained by drying the slurry. The zeolites of the above forms may also be used in combination.

The above crystalline aluminosilicates are obtainable by conventional methods. For instance, methods disclosed in Japanese Patent Laid-Open Nos. 50-12381 and 51-12805 may be employed.

On the other hand, the amorphous aluminosilicates represented by the same general formula as the above crystalline aluminosilicate are also obtainable by conventional methods. For instance, the amorphous aluminosilicates are prepared by adding an aqueous solution of a low-alkali alkali metal aluminate having a molar ratio of $M_2O$ to $Al_2O_3$ (M standing for an alkali metal) of $M_2O/Al_2O_3$=1.0 to 2.0 and a molar ratio of $H_2O$ to $M_2O$ of $H_2O/M_2O$=6.0 to 500 to an aqueous solution of an alkali metal silicate having a molar ratio of $SiO_2$ to $M_2O$ of $SiO_2/M_2O$=1.0 to 4.0 and a molar ratio of $H_2O$ to $M_2O$ of $H_2O/M_2O$=12 to 200 under vigorous stirring at normally 15 to 60° C., preferably 30 to 50° C.

The intended product can be advantageously obtained by heat-treating a white slurry of precipitates thus formed at 70 to 100° C., preferably 90 to 100° C., for normally not less than 10 minutes and not more than 10 hours, preferably not more than 5 hours, followed by filtration, washing and drying. Incidentally, the aqueous solution of an alkali metal silicate may be added to the aqueous solution of a low-alkali alkali metal aluminate.

By this method, the oil-absorbing amorphous aluminosilicate carrier having an ion exchange capacity of not less than 100 $CaCO_3$ mg/g and an oil-absorbing capacity of not less than 80 ml/100 g can be easily obtained (see Japanese Patent Laid-Open Nos. 62-191417 and 62-191419).

Examples of other metal ion capturing agents include aminotri(methylenephosphonic acid), 1-hydroxyethylidene-1,1-diphosphonic acid, ethylenediaminetetra (methylenephosphonic acid), diethylenetriaminepenta (methylenephosphonic acid), and salts thereof; salts of phosphonocarboxylic acids, such as salts of 2-phosphonobutane-1,2-dicarboxylic acid; amino acid salts, such as salts of aspartic acid and salts of glutamic acid; aminopolyacetates, such as nitrilotriacetates and ethylenediaminetetraacetates*; and polycarboxylates, such as citrates*.

Examples of other components which may be added to the detergent composition in the present invention as alkalizers besides crystalline and amorphous alkali metal silicates include various compounds including alkali metal salts such as alkali metal carbonates and alkali metal sulfites, and organic amines, such as alkanolamines.

In addition, color-fading preventives, and recontamination preventives generally used for detergent compositions, including non-dissociating polymers such as polyethylene glycols, polyvinyl alcohols, and polyvinyl pyrrolidones; organic acid salt builders, such as diglycolates and oxycarboxylates; and carboxymethyl cellulose may be optionally used.

Besides the above, the following components may be also contained in the detergent composition of the present invention. Specifically, the detergent composition of the present invention may contain one or more components selected from enzymes, such as protease, lipase, cellulase, and amylase; caking preventives, such as lower alkylbenzenesulfonates whose alkyl moieties have about 1 to 4 carbon atoms, sulfosuccinates, talc, and calcium silicates; antioxidants, such as tert-butylhydroxytoluene, and distyrenated cresol; bleaching agents, such as sodium percarbonate; bleaching activators, such as tetraacetylethylenediamine; fluorescent dyes; blueing agents; and perfume, without being particularly limited thereto, to give compositions suitable for their purposes.

The detergent compositions of the present invention containing each of the components described above may be produced by any of the conventionally known methods without particular limitation. Examples of the methods for producing high-bulk density detergents include the methods disclosed in Japanese Patent Laid-Open Nos. 61-69897, 61-69899, 61-69900, and 5-209200.

The present invention will be further described by means of the following preparation examples and test examples, without intending to restrict the scope of the present invention thereto.

The measurements shown in Examples are obtained as follows:

(1) pH of Washing Liquid

The pH of the washing liquid was measured by adding a detergent composition to the water for washing and then measuring a pH with a glass electrode pH meter (manufactured by HORIBA Ltd.). Here, the pH of the washing liquid refers to the sufficiently stabilized indicated value.

(2) Amount of Materials Having Ion Capturing Capacity

The ion capturing ability was measured by the following different methods in accordance to a case where the materials used having a metal ion capturing capacity are ion exchange materials and a case where the materials are chelating agents. Incidentally, the ion capturing capacity of the metal ion capturing agents are expressed by CEC (calcium ion exchange capacity) in Tables as in the same manner as in alkali metal silicates.

Ion Exchanqe Materials

A 0.1 g sample is accurately weighed and added to 100 ml of a calcium chloride aqueous solution (500 ppm concentration, when calculated as $CaCO_3$), followed by stirring at 25° C. for 60 minutes, after which the mixture is filtered using Membrane Filter (made of nitrocellulose; manufactured by Advantech) with 0.2 $\mu$m pore size. 10 ml of the filtrate is assayed for Ca content by an EDTA titration, and the calcium ion exchange capacity (cationic exchange capacity) of the sample is calculated from the titer.

Chelating Agents

The calcium ion capturing capacity was measured by the following method using a calcium ion electrode. Incidentally, the solution used herein was prepared with the following buffer solution:

Buffer: 0.1 M—$NH_4Cl$—$NH_4OH$ solution (pH 10.0)

(i) Preparation of Calibration Curve

A standard calcium ion solution was prepared and used for obtaining a calibration curve showing the relationships between the logarithm of the calcium ion concentration and the voltage, as shown in FIG. 1.

(ii) Measurement of Calcium Ion Capturing Capacity

About a 0.1 g sample was weighed into a 100 ml volumetric flask, and the volumetric flask was filled up to a volume of 100 ml with the above buffer solution. A $CaCl_2$ aqueous solution (pH 10.0) having a concentration of 20,000 ppm calculated as $CaCO_3$ was added dropwise from a burette in an amount of 0.1 to 0.2 ml for reading each sample voltage. A blank sample was also measured. Thus, a calcium ion concentration was calculated from the calibration curve given in FIG. 1 by applying a sample voltage. The calcium ion concentration of the upper line corresponding to the amount A of samples added dropwise shown in FIG. 2 was referred to as calcium ion capturing capacity.

In the case where the amount of the materials having an ion capturing capacity was calculated, when using the water with hardness of 4° DH as in Examples, the ion concentration of the water corresponded to 71.6 $CaCO_3$ mg/L (2148 $CaCO_3$ mg/30 L), the ion concentration corresponding to the water hardness of 0.5° DH being 9.0 $CaCO_3$ mg/L (270 $CaCO_3$ mg/30 L). Therefore, in order to adjust the water hardness of the water for washing from 4° DH to 0.5° DH, at least a materials having an ion capturing capacity corresponding to an amount of 62.6 $CaCO_3$ mg/L (1878 $CaCO_3$ mg/30 L) was necessary. Therefore, the amounts of the material having an ion capturing capacity were expressed using units of $CaCO_3$ mg/L in Tables.

(3) Average Particle Size and Particle Size Distribution of Alkali Metal Silicates The average particle size and the particle size distribution were measured by using a laser scattering particle size distribution analyzer. Specifically, about 200 ml of ethanol was poured into a measurement cell of a laser scattering particle size distribution analyzer ("LA-700," manufactured by HORIBA Ltd.), and about a 0.5 to 5 mg sample was suspended in ethanol. Next, while irradiating ultrasonic wave, the mixture was agitated for one minute, to thereby sufficiently disperse the sample. Thereafter, an He—Ne laser beam (632.8 nm) was irradiated, and the particle size distribution was measured from the diffraction/scattering patterns. The analysis was made based on the combined theories of Fraunhofer diffraction theory and Mie scattering theory. The particle size distribution of the suspended particles in the liquid was measured in the size range of from 0.04 to 262 $\mu$m. The average particle size was a median of the particle size distribution.

PREPARATION EXAMPLE 1

(Crystalline Alkali Metal Silicates A to E)

To 1000 parts by weight of No. 2 sodium silicate ($SiO_2$/$Na_2O$=2.5), 55.9 parts by weight of sodium hydroxide and 8.5 parts by weight of potassium hydroxide were added, followed by stirring using a homomixer to thereby dissolve sodium hydroxide and potassium hydroxide. To this solution, 5.23 parts by weight of finely milled anhydrous calcium carbonate and 0.13 parts by weight of magnesium nitrate hexahydrate were added, and the components were agitated by using a homomixer. A given amount of the mixture was transferred into a nickel crucible and baked in the air at a temperature of 700° C. for one hour, followed by rapid cooling. The obtained baked product was milled, to give an alkali metal silicate A in the present invention. This powder was found to have a high ion exchange capacity of 305 $CaCO_3$ mg/g.

In the same manner as above, alkali metal silicates B, C, D, and E, each having the composition shown in Table 1, were obtained.

TABLE 1

| | $M_2O$ | K/Na | y/x | $Me_mO_n$ | z/x | Mg/Ca | CEC $CaCO_3$ mg/g |
|---|---|---|---|---|---|---|---|
| A | $Na_2O_2K_2O$ | 0.03 | 1.8 | CaO, MgO | 0.02 | 0.01 | 305 |
| B | $Na_2O$ | — | 1.5 | CaO | 0.2 | — | 303 |
| C | $Na_2O_2K_2O$ | 0.05 | 2.2 | — | — | — | 290 |
| D | $Na_2O$ | — | 2.0 | — | — | — | 224 |
| E | $Na_2O$ | — | 4.0 | — | — | — | 141 |

PREPARATION EXAMPLE 2 (Amorphous Aluminosilicate)

Sodium carbonate was dissolved in ion-exchanged water, to prepare an aqueous solution with 6% by weight concentration. 132 g of the above aqueous solution and 38.28 g of a sodium aluminate aqueous solution (conc. 50% by weight)

were placed in a 1000-ml capacity reaction vessel equipped with baffles. 201.4 grams of a solution of No. 3 Water Glass diluted with water twice were added dropwise to the above mixed solution by under strong agitation at a temperature of 40° C. over a period of 20 minutes. Here, the reaction speed was optimized by adjusting a pH of the reaction system to a pH of 10.5 by blowing a $CO_2$ gas thereinto. Thereafter, the reaction system was heated to a temperature of 50° C. and stirred at 50° C. for 30 minutes. Subsequently, an excess alkali was neutralized by adjusting a pH of the reaction system to a pH of 9.0 by blowing a $CO_2$ gas thereinto. The obtained neutralized slurry was filtered under a reduced pressure using a filter paper (No. 5C, manufactured by Toyo Roshi Kaisha, Ltd.). The filtered cake was rinsed with water in an amount of 1000-folds, and the rinsed cake was filtered and dried under the conditions of 105° C., 300 Torr, and 10 hours. The residual portion was dried under the same conditions as above without giving any further rinsing treatments. Further, the dried cake was broken into particles, to give an amorphous aluminosilicate powder in the present invention. Incidentally, the sodium aluminate aqueous solution was prepared by the steps of adding and mixing 243 g of $Al(OH)_3$ and 298.7 g of a 48% by-weight NAOH aqueous solution in a 1000 cc-capacity four-necked flask, heating the mixture to a temperature of 110° C. with stirring, and maintaining the temperature of 110° C. for 30 minutes, to dissolve the components. As shown by the results of atomic absorption spectrophotometry and plasma emission spectrochemical analysis, the resulting amorphous aluminosilicate had the following composition: $Al_2O_3$=29.696 by weight; $SiO_2$=52.4% by weight; and $Na_2O$=18.0% by weight (1.0 $Na_2O \cdot Al_2O_3 \cdot 3.10\ SiO_2$). In addition, the calcium ion capturing capacity was 185 $CaCO_3$ mg/g, and the oil-absorbing capacity was 285 ml/100 g. The percentage of the microporous capacity having a microporous diameter of less than 0.1 μm was 9.4%, and the percentage of the microporous capacity having a microporous diameter of not less than 0.1 μm and not more than 2.0 μm was 76.3%. The water content was 11.2% by weight.

PREPARATION EXAMPLE 3 (Detergent Compositions)

The crystalline alkali metal silicates A to E, the amorphous aluminosilicate, each obtained in the above Preparation Examples, and other components shown in Tables 2 to 11 were used to prepare the detergent compositions of the present invention having the compositions shown in Tables 2 through 11 by the method described below. Specifically, as for Detergent Compositions 1 through 15 and 17 through 20, given amounts of the aqueous components, including such components as, sodium linear alkylbenzene sulfonate (LAS—Na), sodium alkyl sulfate (AS—Na), No. 1 Sodium Silicate, an acrylic acid-maleic acid copolymer, sodium polyglyoxylate, sodium polyacrylate, sodium citrate, sodium carbonate, sodium sulfate, and sodium sulfite, were prepared as an aqueous slurry of 60% solid content. After spray-drying the slurry, the obtained grains were supplied into Lodige Mixer, after the remaining powder starting materials were supplied into the mixer, the mixture was subjected to mixing granulation while gradually introducing a liquid nonionic surfactant.

As for Detergent Composition 16, the components other than zeolite were prepared as a slurry of 60% solid content, and the slurry was spray-dried to yield grains. The grains were subjected to granulation in High-Speed Mixer after adding a corresponding amount of the zeolite thereinto.

Incidentally, TAED, PC, and enzymes used in each of Detergent Compositions were blended in granular forms.

Thus, powdery detergent compositions with an average particle size of from 300 to 600 μm, each having a bulk density of from 0.6 to 1.0 g/ml were obtained.

TEST EXAMPLE 1

Detergent Compositions 1 through 19 were used to carry out a detergency test under the following conditions:

Preparation of Artificially Stained Cloth

An artificial staining liquid having the following compositions was adhered to a cloth (#2003 calico, manufactured by Senshokushizai Kabushikikaisha Tanigashira Shoten) to prepare an artificially stained cloth. Artificial staining liquid was printed on a cloth by an engravure staining machine equipped with an engravure roll coater. The process for adhering the artificial staining liquid to a cloth to prepare an artificially stained cloth was carried out under the conditions of a cell capacity of a gravure roll of 58 $cm^3/cm^2$, a coating speed of 1.0 m/min, a drying temperature of 100° C., and a drying time of one minute.

| Composition of Artificial Staining Liquid | |
|---|---|
| Lauric acid | 0.44% by weight |
| Myristic acid | 3.09% by weight |
| Pentadecanoic acid | 2.31% by weight |
| Palmitic acid | 6.18% by weight |
| Heptadecanoic acid | 0.44% by weight |
| Stearic acid | 1.57% by weight |
| Oleic acid | 7.75% by weight |
| Triolein | 13.06% by weight |
| n-Hexadecyl palmitate | 2.18% by weight |
| Squalene | 6.53% by weight |
| Egg white lecithin | 1.94% by weight |
| crystalline liquid | |
| Kanuma sekigyoku soil | 8.11% by weight |
| Carbon black | 0.01% by weight |
| Tap water | Balance |

Detergency Conditions

Washing of the above-mentioned artificially stained cloth in 4° DH water (Ca/Mg=3/1) was carried out by using Turgotometer at a rotational speed of 100 rpm, at a temperature of 20° C. for 10 minutes, in which each of Detergent Compositions given in Tables 2, 4, 6, 8, and 10 was used in concentrations given in Tables 3, 5, 7, 9, and 11, respectively.

Incidentally, the typical water hardness components in the water for washing are $Ca^{2+}$ and $Mg^{2+}$, whose weight ratios are generally in the range of Ca/Mg=(60–85)/(40–15). Here, a model sample of water of Ca/Mg=3/1 was used. The unit "° DH" refers to a water hardness which was calculated by replacing Mg with Ca.

Calculation of Detergency Rate

Reflectivities of the original cloth and those of the stained cloth before and after washing were measured at 550 mμ by means of an automatic recording calorimeter (manufactured by Shimadzu Corporation), and the detergency rate D (%) was calculated by the following equation. The results thereof are shown in Tables 3, 5, 7, 9, and 11.

$$D = \frac{(L_2 - L_1)}{(L_0 - L_1)} \times 100\ (\%),$$

wherein $L_o$: Reflectivity of the original cloth;

$L_1$: Reflectivity of the stained cloth before washing; and $L_2$: Reflectivity of the stained cloth after washing.

Incidentally, the abbreviations and materials shown in Tables 2, 4, 6, 8, 10, 12, and 14 are as follows:

*: Comparative product;

POE: Average molar number of ethylene oxide;

LAS—Na: Sodium linear alkylbenzene sulfonate;

AS—Na: Sodium alkyl sulfate;

Acrylic acid-maleic acid copolymer: "SOKALAN CP5," (manufactured by BASF Aktiengesellschaft), a copolymer formed by acrylic acid monomers and maleic acid monomers, weight-average molecular weight of 70,000;

Sodium polyacrylate: a polymer of sodium acrylate, average molecular weight of 10,000;

TAED: Tetraacetylethylenediamine;

PC: Sodium percarbonate;

Protease: ALKALI PROTEASE K-16 disclosed in Japanese Patent Laid-Open No. 5-25492;

Cellulase: ALKALI CELLULASE K disclosed in Japanese Patent Laid-Open No. 63-264699; and Lipase: LIPOLASE, manufactured by NOVO Nordisk Bioindustry LTD.

TABLE 2

| | | | Detergent Composition Nos. | | | |
|---|---|---|---|---|---|---|
| (by weight %) | | | 1-1 | 1-2* | 1-3* | 1-4* |
| Component (a) | | | | | | |
| Polyoxylethylene alkylether nC12POE = 8 | | | 23 | 36 | 5 | 23 |
| Polyoxylethylene alkylether iC12POE = 8 | | | | | | |
| LAS-Na(C12–14) | | | | | | |
| AS-Na(C10–18) | | | | | | |
| Soap(C12–18) | | | 7 | 7 | 1 | 7 |
| Component (b) | | CEC | | | | |
| Crystalline Silicate | A S/N = 1.8 | 305 | 33 | 20 | 57 | 10 |
| | B 1.5 | 303 | | | | |
| | C 2.2 | 290 | | | | |
| | D 2.0 | 224 | | | | |
| | E 4.0 | 141 | | | | |
| JIS No. 1 Sodium Silicate | 2.0 | | | | | |
| Component (c) | | | | | | |
| ZEOLITE 4A | | 280 | 25 | 25 | 25 | 42 |
| Acrylic acid-Maleic acid Copolymer | MW = 70000 | 380 | 8 | 8 | 8 | 14 |
| Sodium Polyglyoxylate | MW = 20000 | 340 | | | | |
| Sodium Polyacrylate | MW = 10000 | 220 | | | | |
| Trisodium Citrate | | 310 | | | | |
| | | | total CEC 208 | total CEC 169 | total CEC 282 | total CEC 209 |
| Other Components | | | | | | |
| Amorphous Aluminosilicate | | 185 | 4 | 4 | 4 | 4 |
| Sodium Carbonate | | | | | | |
| Sodium Sulfate | | | | | | |
| Sodium Sulfite | | | | | | |
| TAED | | | | | | |
| PC | | | | | | |
| Protease | | | | | | |
| Cellulase | | | | | | |
| Lipase | | | | | | |
| Water | | | | | | |
| | | | (a) + (b) + (c) = 96% | (a) + (b) + (c) = 96% | (a) + (b) + (c) = 96% | (a) + (b) + (c) = 96% |

TABLE 3

| Detergent Concentration (g/L) | Surfactant Conc. (g/L) | Ion Capturing Capacity ($CaCO_3$ mg/L) | pH | Detergency Rate (%) | Surfactant Conc. (g/L) | Ion Capturing Capacity ($CaCO_3$ mg/L) | pH | Detergency Rate (%) |
|---|---|---|---|---|---|---|---|---|
| | Detergent Composition Nos. | | | | | | | |
| | 1-1 | | | | 1-2* | | | |
| 1.00 | 0.300 | 208 | 11.15 | 68.7 | 0.430 | 169 | 10.85 | 64.8 |
| 0.83 | 0.249 | 173 | 11.03 | 66.4 | 0.357 | 140 | 10.73 | 62.4 |
| 0.67 | 0.201 | 139 | 10.98 | 64.2 | 0.288 | 113 | 10.58 | 50.1 |

TABLE 3-continued

| Detergent Concentration (g/L) | Surfactant Conc. (g/L) | Ion Capturing Capacity ($CaCO_3$ mg/L) | pH | Detergency Rate (%) | Surfactant Conc. (g/L) | Ion Capturing Capacity ($CaCO_3$ mg/L) | pH | Detergency Rate (%) |
|---|---|---|---|---|---|---|---|---|
| 0.50 | 0.150 | 104 | 10.94 | 63.0 | 0.215 | 84 | 10.48 | 45.3 |
| 0.33 | 0.099 | 69 | 10.72 | 61.6 | 0.142 | 56 | 10.32 | 39.6 |
| 0.25 | 0.075 | 52 | 10.42 | 50.6 | 0.108 | 42 | 10.20 | 35.2 |
| | Detergent Composition Nos. | | | | | | | |
| | 1-3* | | | | 1-4* | | | |
| 1.00 | 0.06 | 282 | 11.45 | 58.2 | 0.300 | 209 | 10.52 | 60.2 |
| 0.83 | 0.05 | 234 | 11.37 | 54.3 | 0.249 | 173 | 10.46 | 53.1 |
| 0.67 | 0.04 | 189 | 11.19 | 50.2 | 0.201 | 140 | 10.38 | 47.3 |
| 0.50 | 0.03 | 141 | 11.01 | 46.1 | 0.150 | 105 | 10.25 | 42.1 |
| 0.33 | 0.02 | 93 | 10.86 | 42.8 | 0.099 | 69 | 10.05 | 38.0 |
| 0.25 | 0.01 | 71 | 10.78 | 30.0 | 0.075 | 52 | 9.62 | 33.3 |

TABLE 4

| (by weight %) | | | Detergent Composition Nos. 1-5* | 1-6* | 1-7* | 1-8* |
|---|---|---|---|---|---|---|
| Component (a) | | | | | | |
| Polyoxylethylene alkylether nC12POE = 8 | | | 23 | 23 | 23 | 30 |
| Polyoxylethylene alkylether iC12POE = 8 | | | | | | |
| LAS-Na(C12–14) | | | | | | |
| AS-Na(C10–18) | | | | | | |
| Soap(C12–18) | | | 7 | 7 | 7 | 7 |
| Component (b) | | CEC | | | | |
| Crystalline Silicate | A S/N = 1.8 | 305 | 56 | | | 10 |
| | B 1.5 | 303 | | | | |
| | C 2.2 | 290 | | | | |
| | D 2.0 | 224 | | | | |
| | E 4.0 | 141 | | | 33 | |
| JIS No. 1 Sodium Silicate | 2.0 | | | | | 15 |
| Component (c) | | | | | | |
| ZEOLITE 4A | | 280 | 8 | 32 | 25 | 25 |
| Acrylic acid-Maleic acid Copolymer | MW = 70000 | 380 | 2 | 14 | 8 | 1 |
| Sodium Polyglyoxylate | MW = 20000 | 340 | | | | |
| Sodium Polyacrylate | MW = 10000 | 220 | | | | |
| Trisodium Citrate | | 310 | | | | |
| | | | total CEC 208 | total CEC 150 | total CEC 154 | total CEC 84 |
| Other Components | | | | | | |
| Amorphous Aluminosilicate | | 185 | 4 | 4 | 4 | 4 |
| Sodium Carbonate | | 20 | | 20 | | |
| Sodium Sulfate | | | | | | |
| Sodium Sulfite | | | | | | |
| TAED | | | | | | |
| PC | | | | | | |
| Protease | | | | | | |
| Cellulase | | | | | | |
| Lipase | | | | | | |
| Water | | | | | | |
| | | | (a) + (b) + (c) = 96% | (a) + (b) + (c) = 76% | (a) + (b) + (c) = 96% | (a) + (b) + (c) = 96% |

TABLE 5

| Detergent Concentration (g/L) | Surfactant Conc. (g/L) | Ion Capturing Capacity ($CaCO_3$ mg/L) | pH | Detergency Rate (%) | Surfactant Conc. (g/L) | Ion Capturing Capacity ($CaCO_3$ mg/L) | pH | Detergency Rate (%) |
|---|---|---|---|---|---|---|---|---|
| | Detergent Composition Nos. | | | | | | | |
| | 1-5 | | | | 1-6* | | | |
| 1.00 | 0.300 | 208 | 11.43 | 60.2 | 0.300 | 150 | 10.51 | 62.1 |
| 0.83 | 0.249 | 173 | 11.35 | 58.3 | 0.249 | 125 | 10.44 | 58.9 |
| 0.67 | 0.291 | 139 | 11.18 | 54.6 | 0.201 | 101 | 10.31 | 50.1 |
| 0.50 | 0.150 | 104 | 11.00 | 54.2 | 0.150 | 75 | 10.19 | 43.2 |
| 0.33 | 0.099 | 69 | 10.84 | 45.5 | 0.099 | 50 | 10.00 | 37.3 |
| 0.25 | 0.075 | 52 | 10.75 | 30.1 | 0.075 | 38 | 9.73 | 32.3 |
| | Detergent Composition Nos. | | | | | | | |
| | 1-7* | | | | 1-8* | | | |
| 1.00 | 0.300 | 154 | 10.10 | 50.2 | 0.550 | 84 | 10.97 | 61.2 |
| 0.83 | 0.249 | 128 | 9.96 | 49.3 | 0.458 | 70 | 10.90 | 58.9 |
| 0.67 | 0.201 | 103 | 9.81 | 45.6 | 0.369 | 56 | 10.86 | 50.1 |
| 0.50 | 0.150 | 77 | 9.69 | 41.2 | 0.275 | 42 | 10.84 | 45.2 |
| 0.33 | 0.099 | 51 | 9.57 | 38.1 | 0.182 | 28 | 10.58 | 40.3 |
| 0.25 | 0.075 | 39 | 9.13 | 29.5 | 0.138 | 21 | 10.23 | 32.1 |

TABLE 6

| | | | Detergent Composition Nos. | | | |
|---|---|---|---|---|---|---|
| (by weight %) | | | 1-9 | 1-10 | 1-11 | 1-12 |
| Component (a) | | | | | | |
| Polyoxylethylene alkylether nC12POE = 8 | | | 20 | 16 | | |
| Polyoxylethylene alkylether iC12POE = 8 | | | | | 18 | 18 |
| LAS-Na(C12–14) | | | | | | |
| AS-Na(C10–18) | | | | 10 | | |
| Soap(C12–18) | | | | | 3 | 3 |
| Component (b) | | CEC | | | | |
| Crystalline Silicate | A S/N = 1.8 | 305 | 33 | 32 | | |
| | B 1.5 | 303 | | | 25 | |
| | C 2.2 | 290 | | | | |
| | D 2.0 | 224 | | | | 25 |
| | E 4.0 | 141 | | | | |
| JIS No. 1 Sodium Silicate | 2.0 | | | | | |
| Component (c) | | | | | | |
| ZEOLITE 4A | | 280 | 22 | 21 | 27 | 27 |
| Acrylic acid-Maleic acid Copolymer | MW = 70000 | 380 | 7 | 6 | | 7 |
| Sodium Polyglyoxylate | MW = 20000 | 340 | | | | |
| Sodium Polyacrylate | MW = 10000 | 220 | | | 7 | |
| Trisodium Citrate | | 310 | | | | |
| | | | total CEC 215 | total CEC 196 | total CEC 174 | total CEC 166 |
| Other Components | | | | | | |
| Amorphous Aluminosilicate | | 185 | 14 | 9 | 4 | 4 |
| Sodium Carbonate | | | | | | |
| Sodium Sulfate | | | | | | |
| Sodium Sulfite | | | 1 | 1 | | |
| TAED | | | | | 4.5 | 4.5 |
| PC | | | | | 9 | 9 |
| Protease | | | 0.6 | 0.6 | 0.6 | 0.6 |
| Cellulase | | | 0.5 | 0.5 | 0.5 | 0.5 |
| Lipase | | | 0.1 | 0.1 | 0.1 | 0.1 |
| Water | | | 1.8 | 3.8 | 1.3 | 1.3 |
| | | | (a) + (b) + (c) = 82% | (a) + (b) + (c) = 85% | (a) + (b) + (c) = 80% | (a) + (b) + (c) = 80% |

TABLE 7

| Detergent Concentration (g/L) | Surfactant Conc. (g/L) | Ion Capturing Capacity ($CaCO_3$ mg/L) | pH | Detergency Rate (%) | Surfactant Conc. (g/L) | Ion Capturing Capacity ($CaCO_3$ mg/L) | pH | Detergency Rate (%) |
|---|---|---|---|---|---|---|---|---|
| | Detergent Composition Nos. | | | | | | | |
| | 1-9 | | | | 1-10 | | | |
| 1.00 | 0.200 | 215 | 11.14 | 64.1 | 0.260 | 196 | 11.13 | 65.3 |
| 0.83 | 0.166 | 178 | 11.01 | 63.8 | 0.216 | 163 | 11.00 | 64.2 |
| 0.67 | 0.134 | 144 | 10.96 | 63.6 | 0.174 | 131 | 10.95 | 63.7 |
| 0.50 | 0.100 | 108 | 10.92 | 63.4 | 0.130 | 98 | 10.91 | 61.8 |
| 0.33 | 0.066 | 71 | 10.68 | 58.0 | 0.085 | 65 | 10.66 | 58.0 |
| 0.25 | 0.050 | 54 | 10.42 | 46.5 | 0.065 | 49 | 10.41 | 46.0 |
| | Detergent Composition Nos. | | | | | | | |
| | 1-11 | | | | 1-12 | | | |
| 1.00 | 0.210 | 174 | 11.00 | 63.1 | 0.210 | 166 | 10.98 | 62.9 |
| 0.83 | 0.174 | 145 | 10.94 | 62.5 | 0.174 | 138 | 10.92 | 62.4 |
| 0.67 | 0.141 | 117 | 10.90 | 61.0 | 0.141 | 111 | 10.87 | 60.8 |
| 0.50 | 0.105 | 87 | 10.86 | 60.8 | 0.105 | 83 | 10.85 | 60.1 |
| 0.33 | 0.069 | 58 | 10.68 | 57.9 | 0.069 | 55 | 10.61 | 56.5 |
| 0.25 | 0.053 | 44 | 10.20 | 45.0 | 0.053 | 42 | 10.28 | 45.0 |

TABLE 8

| (by weight %) | | | | Detergent Composition Nos. 1-13 | 1-14 | 1-15 |
|---|---|---|---|---|---|---|
| Component (a) | | | | | | |
| Polyoxylethylene alkylether nC12POE = 8 | | | | 19 | 19 | 17 |
| Polyoxylethylene alkylether iC12POE = 8 | | | | | | |
| LAS-Na(C12–14) | | | | | | |
| AS-Na(C10–18) | | | | | | |
| Soap(C12–18) | | | | 3 | 3 | 3 |
| Component (b) | | | CEC | | | |
| Crystalline Silicate | A | S/N = 1.8 | 305 | | | |
| | B | 1.5 | 303 | 42 | 42 | |
| | C | 2.2 | 290 | | | |
| | D | 2.0 | 224 | | | |
| | E | 4.0 | 141 | | | |
| JIS No. 1 Sodium Silicate | | 2.0 | | | | 28 |
| Component (c) | | | | | | |
| ZEOLITE 4A | | | 280 | 8 | 8 | 21 |
| Acrylic acid-Maleic acid Copolymer | MW = 70000 | | 380 | | | |
| Sodium Polyglyoxylate | MW = 20000 | | 340 | 25 | 20 | 21 |
| Sodium Polyacrylate | MW = 10000 | | 220 | | | |
| Trisodium Citrate | | | 310 | | 5 | |
| | | | | total CEC 235 | total CEC 233 | total CEC 138 |
| Other Components | | | | | | |
| Amorphous Aluminosilicate | | | 185 | | | 4 |
| Sodium Carbonate | | | | | | |
| Sodium Sulfate | | | | 1 | 1 | 1 |
| Sodium Sulfite | | | | | | |
| TAED | | | | | | |
| PC | | | | | | |
| Protease | | | | 0.8 | 0.8 | 0.8 |
| Cellulase | | | | 0.6 | 0.6 | 0.6 |
| Lipase | | | | 0.2 | 0.2 | 0.2 |
| Water | | | | 0.4 | 0.4 | 0.4 |
| | | | | (a) + (b) + (c) = 97% | (a) + (b) + (c) = 97% | (a) + (b) + (c) = 90% |

TABLE 9

| | Detergent Composition Nos. | | | | | | | | | | | |
|---|---|---|---|---|---|---|---|---|---|---|---|---|
| | 1-13 | | | | 1-14 | | | | 1-15 | | | |
| Detergent Concentration (g/L) | Surfactant Conc. (g/L) | Ion Capturing Capacity ($CaCO_3$ mg/L) | pH | Detergency Rate (%) | Surfactant Conc. (g/L) | Ion Capturing Capacity ($CaCO_3$ mg/L) | pH | Detergency Rate (%) | Surfactant Conc. (g/L) | Ion Capturing Capacity ($CaCO_3$ mg/L) | pH | Detergency Rate (%) |
| 1.00 | 0.220 | 235 | 11.31 | 69.1 | 0.220 | 233 | 11.33 | 68.7 | 0.200 | 138 | 11.01 | 63.5 |
| 0.83 | 0.183 | 195 | 11.18 | 67.2 | 0.183 | 193 | 11.19 | 66.8 | 0.166 | 115 | 10.96 | 62.3 |
| 0.67 | 0.147 | 157 | 10.99 | 66.3 | 0.147 | 156 | 10.98 | 64.1 | 0.134 | 92 | 10.85 | 61.2 |
| 0.50 | 0.110 | 118 | 10.95 | 63.1 | 0.110 | 117 | 10.94 | 63.1 | 0.100 | 69 | 10.78 | 60.0 |
| 0.33 | 0.073 | 78 | 10.88 | 60.4 | 0.073 | 77 | 10.87 | 60.0 | 0.066 | 46 | 10.58 | 51.2 |
| 0.25 | 0.055 | 59 | 10.62 | 48.0 | 0.055 | 58 | 10.64 | 49.2 | 0.050 | 35 | 10.31 | 41.6 |

TABLE 10

| | | | Detergent Composition Nos. | | |
|---|---|---|---|---|---|
| (by weight %) | | | 1-16* | 1-17* | 1-18* |
| Component (a) | | | | | |
| Polyoxyethylene alkylether nC12POE = 8 | | | | 16 | 7 |
| Polyoxyethylene alkylether iC12POE = 8 | | | | | |
| LAS-Na(C12–14) | | | 20 | | 6 |
| AS-Na(C10–18) | | | 10 | | 6 |
| Soap(C12–18) | | | 3 | 5 | |
| Component (b) | | CEC | | | |
| Crystalline Silicate | A S/N = 1.8 | 305 | | | |
| | B 1.5 | 303 | | | |
| | C 2.2 | 290 | | | |
| | D 2.0 | 224 | | | 15 |
| | E 4.0 | 141 | | | |
| JIS No. 1 Sodium Silicate | 2.0 | | 3 | | |
| Component (c) | | | | | |
| ZEOLITE 4A | | 280 | 25 | 40 | 11 |
| Acrylic acid-Maleic acid Copolymer | MW = 70000 | 380 | 5 | | 7 |
| Sodium Polyglyoxylate | MW = 20000 | 340 | | 3 | |
| Sodium Polyacrylate | MW = 10000 | 320 | | | 8 |
| Trisodium Citrate | | 310 | total CEC 89 | total CEC 122 | total CEC 116 |
| Other Components | | | | | |
| Amorphous Aluminosilicate | | 185 | | | |
| Sodium Carbonate | | | 25 | 30 | |
| Sodium Sulfate | | | 3 | 4 | |
| Sodium Sulfite | | | 1 | 1 | |
| TAED | | | | | 7 |
| PC | | | | | 23 |
| Protease | | | 0.5 | 0.5 | 0.7 |
| Cellulase | | | 0.4 | 0.4 | 0.6 |
| Lipase | | | 0.1 | 0.1 | 0.1 |
| Water | | | 4 | | 8.6 |
| | | | (a) + (b) + (c) = 66% | (a) + (b) + (c) = 64% | (a) + (b) + (c) = 60% |

| | | | Detergent Composition Nos. | |
|---|---|---|---|---|
| (by weight %) | | | 1-19* | 1-20 |
| Component (a) | | | | |
| Polyoxyethylene alkylether nC12POE = 8 | | | 6.5 | 20 |
| Polyoxyethylene alkylether iC12POE = 8 | | | | |
| LAS-Na(C12–14) | | | 7 | |
| AS-Na(C10–18) | | | | |
| Soap(C12–18) | | | 3 | 3 |
| Component (b) | | CEC | | |
| Crystalline Silicate | A S/N = 1.8 | 305 | | 50 |
| | B 1.5 | 303 | | |
| | C 2.2 | 290 | | |

TABLE 10-continued

| | | | | |
|---|---|---|---|---|
| | D | 2.0 | 224 | 2 |
| | E | 4.0 | 141 | |
| JIS No. 1 Sodium Silicate | | 2.0 | | 3 |
| Component (c) | | | | |
| ZEOLITE 4A | | | 280 | 31 | 15 |
| Acrylic acid-Maleic acid Copolymer | MW = 70000 | | 380 | 2.5 | 3 |
| Sodium Polyglyoxylate | MW = 20000 | | 340 | | |
| Sodium Polyacrylate | MW = 10000 | | 320 | | |
| Trisodium Citrate | | | 310 | total CEC 101 | total CEC 210 |
| Other Components | | | | | |
| Amorphous Aluminosilicate | | | 185 | | 2 |
| Sodium Carbonate | | | | | |
| Sodium Sulfate | | | | 10 | 2 |
| Sodium Sulfite | | | | | 1 |
| TAED | | | | 2 | |
| PC | | | | 26 | |
| Protease | | | | 0.5 | 0.7 |
| Cellulase | | | | 0.4 | 0.5 |
| Lipase | | | | 0.1 | 0.1 |
| Water | | | | 6 | 2.7 |
| | | | | (a) + (b) + (c) = 55% | (a) + (b) + (c) = 91% |

TABLE 11

| | Detergent Composition Nos. | | | | | | | | | | | |
|---|---|---|---|---|---|---|---|---|---|---|---|---|
| | 1-16* | | | | 1-17* | | | | 1-18* | | | |
| Detergent Concentration (g/L) | Surfactant Conc. (g/L) | Ion Capturing Capacity ($CaCO_3$ mg/L) | pH | Detergency Rate (%) | Surfactant Conc. (g/L) | Ion Capturing Capacity ($CaCO_3$ mg/L) | pH | Detergency Rate (%) | Surfactant Conc. (g/L) | Ion Capturing Capacity ($CaCO_3$ mg/L) | pH | Detergency Rate (%) |
| 1.00 | 0.330 | 89 | 10.75 | 65.1 | 0.210 | 122 | 10.70 | 62.1 | 0.190 | 116 | 10.78 | 62.2 |
| 0.83 | 0.274 | 74 | 10.61 | 62.1 | 0.174 | 101 | 10.55 | 58.9 | 0.158 | 96 | 10.62 | 59.3 |
| 0.67 | 0.221 | 60 | 10.55 | 53.2 | 0.141 | 82 | 10.41 | 50.1 | 0.127 | 78 | 10.45 | 53.2 |
| 0.50 | 0.165 | 45 | 10.20 | 46.2 | 0.105 | 61 | 10.37 | 46.3 | 0.095 | 58 | 10.32 | 48.6 |
| 0.33 | 0.109 | 29 | 10.46 | 41.3 | 0.069 | 40 | 10.29 | 41.0 | 0.063 | 38 | 10.16 | 43.1 |
| 0.25 | 0.083 | 22 | 10.29 | 35.1 | 0.053 | 31 | 10.18 | 33.7 | 0.048 | 29 | 9.91 | 39.0 |

| | 1-19* | | | | 1-20 | | | |
|---|---|---|---|---|---|---|---|---|
| Detergent Concentration (g/L) | Surfactant Conc. (g/L) | Ion Capturing Capacity ($CaCO_3$ mg/L) | pH | Detergency Rate (%) | Sufactant Conc. (g/L) | Ion Capturing Capacity ($CaCO_3$ mg/L) | pH | Detergency Rate (%) |
| 1.00 | 0.165 | 101 | 10.36 | 53.2 | 0.230 | 209.6 | 11.99 | 65.7 |
| 0.83 | 0.137 | 84 | 10.12 | 46.1 | 0.191 | 174.0 | 11.31 | 64.4 |
| 0.67 | 0.111 | 68 | 9.81 | 10.3 | 0.154 | 140.4 | 11.13 | 62.1 |
| 0.50 | 0.082 | 51 | 9.62 | 37.2 | 0.115 | 104.8 | 10.96 | 60.9 |
| 0.33 | 0.054 | 33 | 9.51 | 34.1 | 0.076 | 69.2 | 10.81 | 59.2 |
| 0.25 | 0.041 | 25 | 9.12 | 30.2 | 0.058 | 52.4 | 10.71 | 46.7 |

As is clear from the results in Tables 2 to 11, when the washing liquids satisfied the washing conditions (1) to (3), provided that the washing liquids do not contain clothes to be washed (Detergent Compositions 1-1, 1-9 through 1-15, and 1-20), high detergency rates were obtained. Particular in the case where detergent compositions had weight ratios of the crystalline alkali metal silicate to the metal ion capturing agent other than the crystalline alkali metal silicate in the ranges of from 5/1 to 1/15, the resulting detergent compositions showed a good detergency of not less than 60%. In addition, even in the case where the washing liquid had a low concentration of the detergent composition of from 0.33 to 0.67 g/L, as exemplified by Detergent Composition No. 1-1 in Table 3, a high detergency rate of not less than 60% was maintained. This means that since the standard amount of dosage of the conventional products for one wash is 25 to 30 g/30 L, the present invention product has been further made compact 0.4 to 0.7 times those of conventional compact detergents.

By contrast, as for the washing liquids which did not satisfy the washing conditions (1) to (3) mentioned above (Detergent Compositions 1-2 through 1-8, and 1-16 through 1-19), in the case where the washing liquid had a low concentration of the detergent composition of from 0.33 to 0.67 g/L, only low detergency rates were achieved.

TEST EXAMPLE 2

Detergent Compositions shown in Table 12 were used to carry out a detergency test under the following conditions:

The same washing procedures as in Test Example 1 were carried out except that the washing temperature was changed to 30° C., and that the water used for washing was changed to that having a water hardness of 8° DH (Ca/Mg 3/1), at detergent concentrations shown in Table 13. The results are shown in Table 13.

TABLE 12

| | | Detergent Composition Nos. | | |
|---|---|---|---|---|
| | | CEC | 2-1 | 2-2* |
| Component (a) | | | | |
| LAS (C12) | | | | |
| AS (C14–15) | | | | |
| Soap (C12–20) | | | 4.00 | 5.00 |
| Polyoxyethylene alkyl-ether nC12–14 POE = 8 | | | 12.50 | 20.00 |
| Component (b) | | | | |
| Crystalline Silicate | | | | |
| A | | 305 | 28.00 | 10.00 |
| B | | 303 | | |
| C | | 290 | | |
| D | | 224 | | |
| E | | 141 | | |
| Sodium silicate | | 0 | | |
| Component (c) | | | | |
| Acrylic acid-maleic acid Copolymer | MW = 70000 | 380 | 4.00 | 5.00 |
| Zeotite | | 280 | 40.00 | 40.00 |
| Sodium Polyglyoxylate | MW = 20000 | 340 | | |
| Sodium Polyacrylate | MW = 10000 | 220 | | |
| Trisodium Citrate | | 310 | | |
| Other Components | | | | |
| Amorphous Aluminosilicate | | 185 | 3.50 | 11.00 |
| Sodium Carbonate | | | | |
| Sodium Sulfate | | | 3.00 | 4.0 |
| Sodium Sulfite | | | 0.50 | 0.50 |
| TAED | | | | |
| Sodium Percarbonate | | | | |
| Protease | | | 0.90 | 0.90 |
| Cellulase | | | 0.90 | 0.90 |
| Lipase | | | 0.90 | 0.90 |
| Other Components | | | 1.80 | 1.80 |
| Total (%) | | | 100.00 | 100.00 |
| Surfactant | (a) | | 16.50 | 25.00 |
| Alkali Metal Silicates | (b) | | 28.00 | 10.00 |
| Other Builders | (c) | | 44.00 | 45.00 |
| (a) + (b) + (c) = | | | 88.50 | 80.00 |
| Ion Capturing Capacity (TOTAL CEC) | | | 219.08 | 181.85 |

As is clear from Table 13, when the washing liquid (Detergent Composition No. 2-1) satisfied the washing conditions (1) to (3), a high detergency rate was obtained. By contrast, as for the washing liquid (Detergent Composition 2-2) which did not satisfy the washing conditions (1) to (3) mentioned above, in the case where the washing liquid had a low concentration of the detergent composition of from 0.50 to 1.20 g/L, only a low detergency rate was achieved.

TEST EXAMPLE 3

Detergent Compositions shown in Table 14 were used to carry out a detergency test under the following conditions: The same washing procedures as in Test Example 1 were carried out except that the washing time was changed to 30 minutes, that the washing temperature was changed to 40° C., and that the water used for washing was changed to that having a water hardness of 15° DH (Ca/Mg=3/1), at detergent concentrations shown in Table 15. The results are shown in Table 15.

TABLE 14

| | | Detergent Composition Nos. | | |
|---|---|---|---|---|
| | | CEC | 3-1 | 3-2* |
| Component (a) | | | | |
| LAS (C12) | | | | |
| AS (C14–15) | | | | |
| Soap (C12–20) | | | 3.00 | 3.00 |
| Polyoxyethylene alkyl-ether nC12–14 POE = 8 | | | 10.40 | 18.40 |
| Component (b) | | | | |
| Crystalline Silicate | | | | |
| A | | 305 | 20.00 | 8.00 |
| B | | 303 | | |
| C | | 290 | | |
| D | | 224 | | |
| E | | 141 | | |
| Sodium silicate | | 0 | | |
| Component (c) | | | | |
| Acrylic acid-maleic acid Copolymer | MW = 70000 | 380 | 9.00 | 9.00 |
| Zeolite | | 280 | 44.00 | 40.00 |
| Sodium Polygloxylate | MW = 20000 | 340 | | |
| Sodium Polyacrylate | MW = 10000 | 220 | | |
| Trisodium Citrate | | 310 | 3.00 | 3.00 |

TABLE 13

| | Detergent Composition Nos. | | | | | | | |
|---|---|---|---|---|---|---|---|---|
| | 2-1 | | | | 2-2° | | | |
| Detergent Concentration (g/L) | Surfactant Conc. (g/L) | Ion Capturing Capacity ($CaOC_3$ mg/L) | pH | Detergency Rate (%) | Surfactant Conc. (g/L) | Ion Capturing Capacity ($CaCO_3$ mg/L) | pH | Detergency Rate (%) |
| 2.00 | 0.330 | 438.2 | 11.32 | 75.8 | 0.500 | 363.7 | 10.90 | 64.4 |
| 1.50 | 0.248 | 328.6 | 11.19 | 70.7 | 0.375 | 272.8 | 10.75 | 60.6 |
| 1.20 | 0.198 | 262.9 | 11.10 | 68.0 | 0.300 | 218.2 | 10.56 | 55.2 |
| 1.00 | 0.165 | 219.1 | 11.00 | 66.1 | 0.250 | 181.9 | 10.36 | 51.3 |
| 0.83 | 0.137 | 181.8 | 10.94 | 63.3 | 0.208 | 150.9 | 10.13 | 47.1 |
| 0.66 | 0.111 | 146.8 | 10.88 | 60.4 | 0.168 | 121.8 | 9.94 | 44.3 |
| 0.50 | 0.083 | 109.5 | 10.69 | 52.1 | 0.125 | 90.9 | 9.72 | 40.6 |
| 0.33 | 0.054 | 72.3 | 10.38 | 46.4 | 0.083 | 60.0 | 9.51 | 35.1 |

TABLE 14-continued

| | | Detergent Composition Nos. | | |
|---|---|---|---|---|
| | | CEC | 3-1 | 3-2* |
| Other Components | | | | |
| Amorphous Aluminosilicate | | 185 | 3.00 | 10.00 |
| Sodium Carbonate | | | | |
| Sodium Sulfate | | | 3.00 | 3.00 |
| Sodium Sulfite | | | 0.50 | 0.50 |
| TAED | | | | |
| Sodium Percarbonate | | | | |
| Protease | | | 0.60 | 0.60 |
| Cellulase | | | 0.60 | 0.60 |
| Lipase | | | 0.60 | 0.60 |
| Other Components | | | 2.30 | 3.30 |
| Total (%) | | | 100.00 | 100.00 |
| Surfactant | (a) | | 13.40 | 21.40 |
| Alkali Metal Silicates | (b) | | 20.00 | 8.00 |
| Other Builders | (c) | | 56.00 | 52.00 |
| (a) + (b) + (c) = | | | 59.40 | 81.40 |
| Ion Capturing Capacity (TOTAL CEC) | | | 233.25 | 198.40 |

We claim:

1. A clothes washing method which comprises:

(i) adding a phosphorus-free clothes detergent composition comprising (a) one or more surfactants, (b) one or more alkali metal silicates having an $SiO_2/M_2O$ ratio of from 0.5 to 2.6 wherein M stands for an alkali metal, and (c) one or more metal ion capturing agents other than the alkali metal silicate (b) selected from the group consisting of carboxylate polymers; aluminosilicates; aminotri(methylenephosphonic acid); 1-hydroxyethylidene-1,1-diphosphonic acid; ethylenediaminetetra (methylenephosphonic acid); diethylenetriaminepenta (methylenephosphonic acid); and salts thereof; salts of phosphonocarboxylic acids; amino acid salts and aminopolyacetates, wherein the total amount of (a), (b), and (c) components occupies 70 to 100% by weight of the entire composition, and wherein the weight ratio of the alkali metal silicate (b) to the metal ion capturing agent other than the alkali metal silicate (c) is not more than 5/1, to washing water in an amount sufficient to produce a washing liquid having the following washing conditions:

(1) a pH of not less than 10.60;

(2) containing a material having an ion capturing capacity in an amount sufficient for theoretically changing the water hardness of said washing water to be not more than 0.5° DH; and (3) having a surfactant concentration of from 0.07 to 0.17 g/L; and (ii) washing clothes in said washing liquid.

2. The washing method according to claim 1, wherein the concentration of the detergent composition in the washing liquid is from 0.33 to 0.67 g/L for washing water having a water hardness of from 2 to 6° DH.

3. The washing method according to claim 1, wherein the concentration of the detergent composition in the washing liquid is from 0.50 to 1.20 g/L for washing water having a water hardness of from 6 to 10° DH.

4. The washing method according to claim 1, wherein the concentration of the detergent composition in the washing liquid is from 0.80 to 2.50 g/L for washing water having a water hardness of from 10 to 20° DH.

5. The washing method according to claim 1, wherein the total amount of (a), (b), and (c) components occupies 80 to 100% by weight of the entire composition.

6. A phosphorous-free clothes detergent composition comprising components (a) to (c):

(a) one or more surfactants;

TABLE 15

| | Detergent Composition Nos. | | | | | | | |
|---|---|---|---|---|---|---|---|---|
| | 3-1 | | | | 3-2° | | | |
| Detergent Concentration (g/L) | Surfactant Conc. (g/L) | Ion Capturing Capacity ($CaOC_3$ mg/L) | pH | Detergency Rate (%) | Surfactant Conc. (g/L) | Ion Capturing Capacity ($CaCO_3$ mg/L) | pH | Detergency Rate (%) |
| 4.00 | 0.536 | 933.0 | 11.26 | 76.1 | 0.856 | 793.6 | 10.77 | 64.8 |
| 3.00 | 0.402 | 699.8 | 11.14 | 73.4 | 0.642 | 595.2 | 10.69 | 60.0 |
| 2.50 | 0.335 | 583.0 | 11.02 | 70.2 | 0.535 | 496.0 | 10.58 | 56.2 |
| 2.00 | 0.268 | 466.5 | 10.91 | 67.2 | 0.428 | 396.8 | 10.45 | 50.1 |
| 1.50 | 0.201 | 349.9 | 10.74 | 63.6 | 0.321 | 297.6 | 10.30 | 46.1 |
| 1.20 | 0.161 | 279.9 | 10.66 | 60.2 | 0.257 | 238.1 | 10.09 | 37.2 |
| 1.00 | 0.134 | 233.3 | 10.56 | 51.3 | 0.214 | 198.4 | 9.97 | 30.1 |
| 0.83 | 0.111 | 193.6 | 10.45 | 43.2 | 0.178 | 164.7 | 9.80 | 25.3 |
| 0.67 | 0.090 | 156.3 | 10.32 | 38.6 | 0.143 | 132.9 | 9.50 | 20.1 |

As is clear from Table 15, when the washing liquid (Detergent Composition No. 3-1) satisfied the washing conditions (1) to (3), a high detergency rate was obtained. By contrast, as for the washing liquid (Detergent Composition 3-2) which did not satisfy the washing conditions (1) to (3) mentioned above, in the case where the washing liquid had a low concentration of the detergent composition of from 0.80 to 2.50 g/L, only a low detergency rate was achieved.

INDUSTRIAL APPLICABILITY

According to the washing method and the clothes detergent composition of the present invention, since the surfactant concentration can be kept low and the washing power is excellent, the standard amount of dosage of the detergent is remarkably smaller than the conventional compact clothes detergent composition. In addition, since the detergent composition is phosphorus-free, the detergent composition is less susceptible to cause environmental problems.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

(b) one or more alkali metal silicates having an $SiO_2/M_2O$ ratio of from 0.5 to 2.6 wherein M stands for an alkali metal; and (c) one or more metal ion capturing agents selected from the group consisting of carboxylate polymers; aluminosilicates; aminotri(methylenephosphonic acid); 1-hydroxyethylidene-1,1-diphosphonic acid; ethylenediaminetetra (methylenephosphonic acid); diethylenetriaminepenta (methylenephosphonic acid); and salts thereof; salts of phosphonocarboxylic acids; amino acid salts; [and] aminopolyacetates*; and polycarboxylates*, wherein the total amount of (a), (b), and (c) components occupies 70 to 100% by weight of the entire composition, and wherein the weight ratio of component (b) to component (a) is 9/1 to [1/2] *9/11*, and the weight ratio of component (b) to component (c) is 5/1 to 1/15.

7. The clothes detergent composition according to claim 6, wherein the weight ratio of component (b) to component (a) is 9/1 to 9/11, and the weight ratio of component (b) to component (c) is 4/1 to 1/15.

8. The clothes detergent composition according to claim 6 or 7, wherein the surfactant contains a nonionic surfactant in an amount of 50 to 100% by weight.

9. The clothes detergent composition according to claim 8, wherein the nonionic surfactant is a polyoxyethylene alkyl ether having an ethylene oxide moiety with an average molar number of from 5 to 15 and an alkyl moiety having an average number of carbon atoms of from 10 to 18.

10. The clothes detergent-composition according to claim 6, wherein the alkali metal silicate is contained as an alkalizer in an amount of 50 to 100% by weight of the entire alkalizer.

11. The clothes detergent composition according to claim 10, wherein the alkali metal silicate is contained as an alkalizer in an amount of 70 to 100% by weight of the entire alkalizer.

12. The clothes detergent composition according to claim 6, wherein the alkali metal silicate is crystalline.

13. The clothes detergent composition according to claim 12, wherein the crystalline alkali metal silicate is represented by the following formula (I):

$$xM_2O \cdot ySiO_2 \cdot zMe_mO_n \cdot wH_2O, \quad (I)$$

wherein M represents an alkali metal; Me stands for one or more elements selected from the group consisting of Group IIa, IIb, IVa, and VIII; y/x is 0.5 to 2.6; z/x is 0.01 to 1.0; n/m is 0.5 to 2.0; and w is 0 to 20.

14. The clothes detergent composition according to claim 12, wherein the crystalline alkali metal silicate is represented by the following formula (II):

$$M_2O \cdot x'SiO_2 \cdot y'H_2O, \quad (II)$$

wherein M stands for an alkali metal; x' is 1.5 to 2.6; and y' is 0 to 20.

15. The clothes detergent composition according to claim 6, wherein the (c) metal ion capturing agent contains a carboxylate polymer having a Ca ion capturing capacity of not less than 200 $CaCO_3$ mg/g in an amount of not less than 10% by weight.

16. The clothes detergent composition according to claim 6, wherein the (c) metal ion capturing agent comprises:

(c-i) a carboxylate polymer having a Ca ion capturing capacity of not less than 200 $CaCO_3$ mg/g; and (C-ii) an aluminosilicate having an ion exchange capacity of not less than 200 $CaCO_3$ mg/g and having the following formula (III):

$$x''(M_2O) \cdot Al_2O_3 \cdot y''(SiO_2) \cdot w''(H_2O), \quad (III)$$

wherein M stands for an alkali metal; x", y", and w" each stands for a molar number of each component; x" is from 0.7 to 1.5; y" is from 0.8 to 6.0; and w" is from 0 to 20, and wherein the weight ratio of (c-i) component to (c-ii) component is (c-i)/(c-ii)=1/20 to 4/1, and the total amount of (c-i) and (c-ii) components occupies 70 to 100% by weight based on the (c) metal ion capturing agent.

17. A clothes washing method which comprises:

(i) adding a phosphorus-free clothes detergent composition comprising (a) one or more surfactants, (b) one or more alkali metal silicates having an $SiO_2/M_2O$ ratio of from 0.5 to 2.6 wherein M stands for an alkali metal, and (c) one or more metal ion capturing agents selected from the group consisting of carboxylate polymers; aluminosilicates; aminotri(methylenephosphonic acid); 1-hydroxyethylidene-1,1-diphosphonic acid; ethylenediaminetetra(methylenephosphonic acid); diethylenetriaminepenta(methylenephosphonic acid); and salts thereof; salts of phosphonocarboxylic acid; amino acid[_]salts [ and]*;* aminopolyacetates*; and polycarboxylates,* wherein the total amount of (a), (b), and (c) components occupies 70 to 100% by weight of the entire composition, and wherein the weight ratio of component (b) to component (a) is 9/1 to 1/2, and the weight ratio of component (b) to component (c) is 5/1 to 1/15, to washing water in an amount sufficient to produce a washing liquid having the following washing conditions:

(1) a pH of not less than 10.60;

(2) containing a material having an ion capturing capacity in an amount sufficient for theoretically changing the water hardness of said washing water to be not more than 0.5° DH; and (3) having a surfactant concentration of from 0.07 to 0.17 g/L; and (ii) washing clothes in said washing liquid.

* * * * *